US012809640B2

(12) United States Patent
He

(10) Patent No.: US 12,809,640 B2
(45) Date of Patent: Nov. 24, 2026

(54) INTERFACE PROCESSING

(71) Applicant: Tencent Technology (Shenzhen) Company Limited, Shenzhen (CN)

(72) Inventor: Fang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 352 days.

(21) Appl. No.: 18/676,259

(22) Filed: May 28, 2024

(65) Prior Publication Data

US 2024/0311164 A1 Sep. 19, 2024

Related U.S. Application Data

(63) Continuation of application No. PCT/CN2023/100320, filed on Jun. 15, 2023.

(30) Foreign Application Priority Data

Aug. 18, 2022 (CN) ......................... 202210993980.4

(51) Int. Cl.
*G06F 9/44* (2018.01)
*G06F 9/30* (2018.01)
*G06F 9/445* (2018.01)

(52) U.S. Cl.
CPC .......... *G06F 9/445* (2013.01); *G06F 9/30087* (2013.01)

(58) Field of Classification Search
CPC ......................................................... G06F 9/44
See application file for complete search history.

(56) References Cited

U.S. PATENT DOCUMENTS 6,204,887 B1 * 3/2001 Hiroi .................. H04N 21/4316 348/588
10,754,767 B2 * 8/2020 Wang .................. G06F 16/9574
(Continued)

FOREIGN PATENT DOCUMENTS

CN 110347446 A 10/2019
CN 111603768 A 9/2020
CN 112203111 A 1/2021

OTHER PUBLICATIONS

International Search Report and Written Opinion received for PCT Patent Application No. PCT/CN2023/100320, mailed on Sep. 28, 2023, 14 pages (6 pages of English Translation and 8 pages of Original copy attached).
(Continued)

*Primary Examiner* — Jae U Jeon
(74) *Attorney, Agent, or Firm* — ARENTFOX SCHIFF LLP

(57) ABSTRACT

In a interface processing method, an interface display instruction to display a user interface is received. When a media resource set of the user interface includes a first group of media resources and a second group of media resources that is different from the first group of media resources, the second group of media resources in the media resource set is loaded based on the interface display instruction, a resource size of each media resource of the first group of media resources being greater than a threshold. The user interface is displayed with the second group of media resources when the second group of media resources are loaded and before the first group of media resources is loaded. The first group of media resources is displayed in the user interface with the second group of media resources when the first group of media resources is loaded.

20 Claims, 9 Drawing Sheets

(56) References Cited

U.S. PATENT DOCUMENTS

| | | | | |
|---|---|---|---|---|
| 2005/0188383 | A1* | 8/2005 | Alcazar | G06F 9/445 719/331 |
| 2017/0178145 | A1* | 6/2017 | Adrian | G06F 16/9535 |
| 2020/0159817 | A1* | 5/2020 | Wood | G06F 16/986 |
| 2022/0256230 | A1* | 8/2022 | Cang | H04N 21/2393 |

OTHER PUBLICATIONS

Office Action received for Chinese Patent Application No. 202210993980.4, mailed on Mar. 7, 2026, 16 pages (8 pages of English Translation and 8 pages of Original Document).

* cited by examiner

INTERFACE PROCESSING

RELATED APPLICATIONS

The present application is a continuation of International Application No. PCT/CN2023/100320, filed on Jun. 15, 2023, which claims priority to Chinese Patent Application No. 202210993980.4, entitled "METHOD AND APPARATUS FOR DISPLAYING TARGET INTERFACE, STORAGE MEDIUM, AND ELECTRONIC DEVICE" and filed on Aug. 18, 2022. The entire disclosures of the prior applications are hereby incorporated by reference.

FIELD OF THE TECHNOLOGY

This disclosure relates to the field of computers, and specifically, to interface processing technologies.

BACKGROUND OF THE DISCLOSURE

An interface of an application may include a variety of media resources, for example, a text resource, an image resource, or another resource. When an interface is opened in the application, it is usually necessary to load all resources included in the interface. If the interface includes an excessively large quantity of media resources, it is necessary to load a large quantity of resources when the interface is opened, and as a result an excessively long time is required to open the interface, affecting the use experience of a user.

As can be seen, interface resource processing methods in the related art have a problem that it is necessary to load an excessively large quantity of resources to open an interface and as a result it takes an excessively long time to open the interface.

SUMMARY

Embodiments of this disclosure provide an interface processing method and apparatus, a non-transitory computer-readable storage medium, and an electronic device, to at least address a problem that it is necessary to load a large quantity of resources to open an interface and as a result it can take an excessively long time to open the interface in the related art.

According to an aspect of embodiments of this disclosure, an interface processing method is provided. The method may b e performed by an electronic device. In the interface processing method, an interface display instruction to display a user interface is received. When a media resource set of the user interface includes a first group of media resources and a second group of media resources that is different from the first group of media resources, the second group of media resources in the media resource set is loaded based on the interface display instruction, a resource size of each media resource of the first group of media resources being greater than a threshold. The user interface is displayed with the second group of media resources when the second group of media resources are loaded and before the first group of media resources is loaded. The first group of media resources is displayed in the user interface with the second group of media resources when the first group of media resources is loaded.

According to another aspect of the embodiments of this disclosure, an information processing apparatus is further provided. The apparatus may be deployed on an electronic device. The information processing apparatus includes processing circuitry that is configured to receive an interface display instruction to display a user interface. The processing circuitry is configured to load, when a media resource set of the user interface includes a first group of media resources and a second group of media resources that is different from the first group of media resources, the second group of media resources in the media resource set based on the interface display instruction, a resource size of each media resource of the first group of media resources being greater than a threshold. The processing circuitry is configured to display the user interface with the second group of media resources when the second group of media resources are loaded and before the first group of media resources is loaded. The processing circuitry is configured to display the first group of media resources in the user interface with the second group of media resources when the first group of media resources is loaded.

According to still another aspect of the embodiments of this disclosure, a non-transitory computer-readable storage medium is further provided. The non-transitory computer-readable storage medium stores instructions which when executed by a processor cause the processor to perform any of the interface processing methods.

According to still another aspect of the embodiments of this disclosure, a computer program product is provided, the computer program product including a computer program, the computer program being stored in a computer-readable storage medium. A processor of a computer device reads the computer program from the computer-readable storage medium, and the processor performs the computer program, to cause the computer device to perform any of the interface processing methods of a to-be-processed interface.

According to still another aspect of the embodiments of this disclosure, an electronic device is further provided, including a memory and a processor, the memory storing a computer program, the foregoing processor being configured to execute the computer program to perform any of the interface processing methods.

For example, a manner in which an interface including all loaded media resources is displayed right after small media resources have been synchronously loaded is used in the embodiments of this disclosure. After an interface display instruction for a to-be-processed interface is acquired, if specific media resources (each specific media resource has a resource size greater than a preset threshold, that is, a first group of media resources) exist in a to-be-loaded media resource set in the to-be-processed interface, it is only necessary to synchronously load other media resources (that is, a second group of media resources) than the specific media resources. Regardless of whether the specific media resources have been loaded, the to-be-processed interface including all loaded media resources is displayed. Because the display of the to-be-processed interface does not depend on the specific media resources whose resource size exceeds the preset threshold, it is only necessary to complete loading of other media resources than the specific media resources before the to-be-processed interface can be displayed. In this manner, a quantity of media resources that need to be loaded to display the interface can be reduced, thereby reducing a time required to open the interface. Moreover, media resources (that is, the first group of media resources) loaded after the interface is displayed may be displayed in the displayed to-be-processed interface, so that the technical effects of shortening a time required to display the interface and improving the completeness of information display can be achieved, thereby resolving a problem that it is necessary to load an excessively large quantity of resources to open an interface and as a result it takes an excessively long time to open the interface in the related art.

BRIEF DESCRIPTION OF THE DRAWINGS

The accompanying drawings described herein are intended to provide further understanding of this disclosure and constitute a part of this disclosure. Example of embodiments of this disclosure and the description thereof are used for explaining this disclosure rather than constituting the improper limitation to this disclosure. In the accompanying drawings.

DESCRIPTION OF EMBODIMENTS

The following describes examples of technical solutions in embodiments of this disclosure with reference to the accompanying drawings. The described embodiments are merely some but not all of the embodiments of this disclosure. All other embodiments obtained by a person of ordinary skill in the art based on the embodiments of this disclosure without creative efforts shall fall within the scope of this disclosure.

The terms such as "first" and "second" in this specification, the claims, and the foregoing accompanying drawings of this disclosure are intended to distinguish between similar objects rather than describe a particular sequence or a chronological order. It is to be understood that the data termed in such a way are interchangeable in proper circumstances, so that the embodiments of this disclosure described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
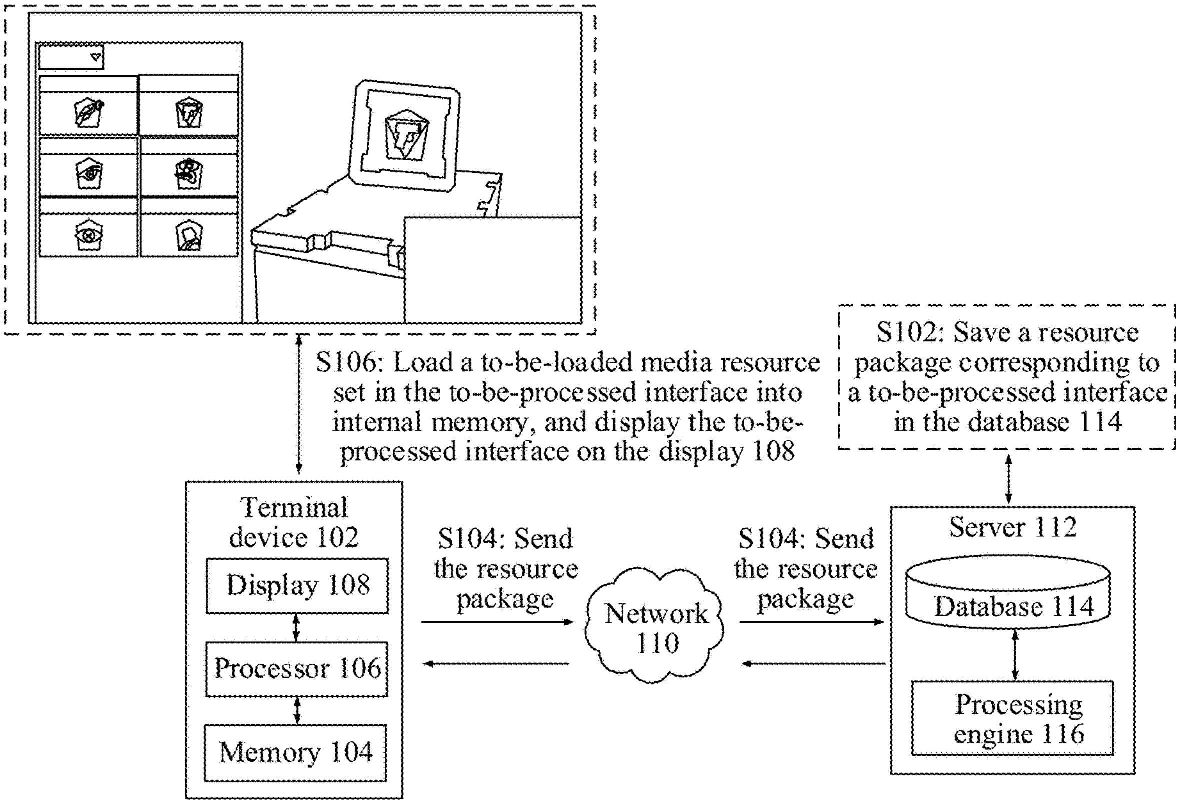
FIG. 1 is a schematic diagram of an application environment of an interface processing method according to an embodiment of this disclosure.

According to an aspect of the embodiments of this disclosure, an interface processing method is provided. In an implementation, the foregoing interface processing method may be applied to, but not limited to, an environment shown in FIG. 1. The environment may include, but not limited to, a terminal device 102, a network 110, and a server 112. The terminal device 102 may include, but not limited to, a display 108, a processor 106, and a memory 104.

A specific process may include the following steps:

S102: Save a resource package corresponding to a to-be-processed interface in a database 114 of the server 112.

The to-be-processed interface may include a variety of media resources. The media resources in the to-be-processed interface may be saved in the corresponding resource package. The resource package may be stored in the database 114 of the server 112.

S104: A processing engine 116 of the server 112 may determine to send the resource package to the terminal device 102, and may send the resource package to the terminal device 102, and the terminal device 102 may receive and save the resource package.

For example, when the terminal device 102 downloads an application to which the to-be-processed interface belongs or updates the application or on another occasion, the processing engine 116 of the server 112 may determine to send the resource package to the terminal device 102.

S106: The terminal device 102 loads a to-be-loaded media resource set in the to-be-processed interface into internal memory, and displays the to-be-processed interface on the display 108.

In a possible implementation, the terminal device 102 includes, but not limited to, at least one of the following: a mobile phone (for example, an Android mobile phone, or an iOS mobile phone), a notebook computer, a tablet computer, a palmtop computer, a mobile Internet device (MID), a PAD, a desktop computer, a smart home appliance, an in-vehicle device, and the like. The network 110 may include, but is not limited to, a wired network and a wireless network. The wired network includes: a local area network, a metropolitan area network, and a wide area network. The wireless network includes: Bluetooth, Wireless Fidelity (Wi-Fi), and another network implementing wireless communication. The server 112 may be an independent server, or may be a cluster server including a plurality of servers, or a cloud server. The foregoing description is merely an example, which is not limited in this embodiment.

In a possible implementation, the foregoing interface processing method may be separately performed by the terminal device 102 or the server 112, or may be performed by another processing device than the terminal device 102 and the server 112, provided that an image set obtained through processing may be applied to the terminal device 102 and the server 112.

Figure 2:
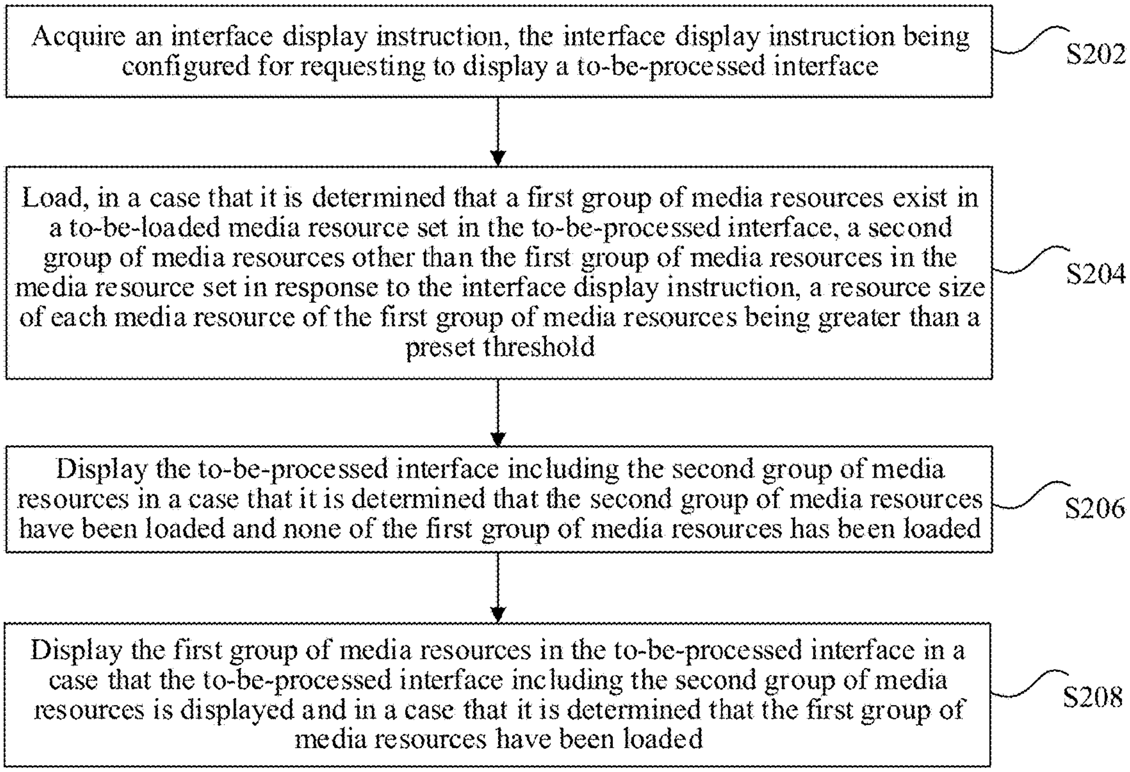
FIG. 2 is a schematic flowchart of an interface processing method according to an embodiment of this disclosure.

In an implementation, an example in which the terminal device 102 performs the interface processing method in this embodiment is used. FIG. 2 is a schematic flowchart of an interface processing method according to an embodiment of this disclosure. As shown in FIG. 2, a procedure of the interface processing method may include the following steps:

S202: Acquire an interface display instruction, the interface display instruction being configured for requesting to display a to-be-processed interface. In an example, an interface display instruction to display a user interface is received.

The interface processing method in this embodiment may be applied to a scenario of loading to-be-displayed media resources in a to-be-processed interface and displaying the to-be-processed interface based on the loaded media resources. The to-be-processed interface here may be a to-be-opened interface, for example, an application interface of an application. The application here may be a game application, a short-video application, a third-party payment application, or another application that has an application interface including media resources. One or more types of media resources may be provided in the to-be-processed interface, and may include, but not limited to, at least one of the following: an image resource, a text resource, an animation resource, and may further a media resource of another type. In a process of opening the to-be-processed interface, various media resources having a strong reference relationship with the to-be-processed interface may be loaded first. After these media resources have been loaded, the to-be-processed interface may be displayed.

A game application is used as an example. The game application may include, but not limited to, all games that use firearms for long-range attack, including, but not limited to, first-person shooter games and third-person shooter games. A target shooting application may be a multiplayer online battle arena (MOBA) game or a single-player game (SPG). A type of a game application may include, but not limited to, at least one of the following: a two-dimensional (2D) game application, a three-dimensional (3D) game application, a virtual reality (VR) game application, an augmented reality (AR) game application, and a mixed reality (MR) game application. The foregoing description is merely an example, which is not limited in this embodiment.

The strong reference may indicate a strong association of loading between different objects. If A has strong reference with B, when A is loaded, B is also loaded into internal memory. Apart from strong reference, different objects may further have a soft reference relationship. The soft reference may indicate a weak association of loading between different objects. If A has soft reference with B, when A is loaded, a resource B is not loaded into the internal memory. Instead, a resource path of B is saved on A, and the resource B may be loaded into the internal memory through the resource path.

A media resource that has a strong reference relationship with the to-be-processed interface may be a media resource that needs to be synchronously loaded. The synchronous loading may be a synchronous mode (also referred to as a blocking mode). While downloading a resource, an engine stops subsequent file loading (for example, images), rendering, execution of code, and the like. A media resource that has a soft reference relationship with the to-be-processed interface may be a media resource that requires asynchronous loading. The asynchronous loading indicates an asynchronous mode (also referred to as a non-blocking mode). While downloading an execution resource, the engine may further continue to perform subsequent logic processing. Through asynchronous loading, interface display abnormalities such as freezing of a game are not caused.

For example, the application is a game application, and the to-be-processed interface is a game interface. When the game interface is opened in the game, if the game interface includes a large quantity of media resources with large sizes (for example, images with relatively large sizes), it takes a long time to open the interface. A long latency severely affects the gaming experience of a user.

For example, a reconstruction person (that is, a person that performs interface construction, for example, an art person) may construct an installation package of the game by using an Unreal Engine 4 (UE4). During the construction of the installation package, various media resources may be added to a constructed game interface by using an Unreal Motion Graphics UI Designer (UMG). UE4 here is a game development engine. Compared with other engines, an unreal engine is efficient and omnipotent and allows direct preview of a development effect, endowing developers with a stronger development capability. UMG is a user interface (UI) system of UE4, and may be used as a visualized UI creation tool to create UI elements, for example, a head-up display (HUD), a menu or another interface-related graphic that needs to be displayed to the user in the game.

Figure 3:
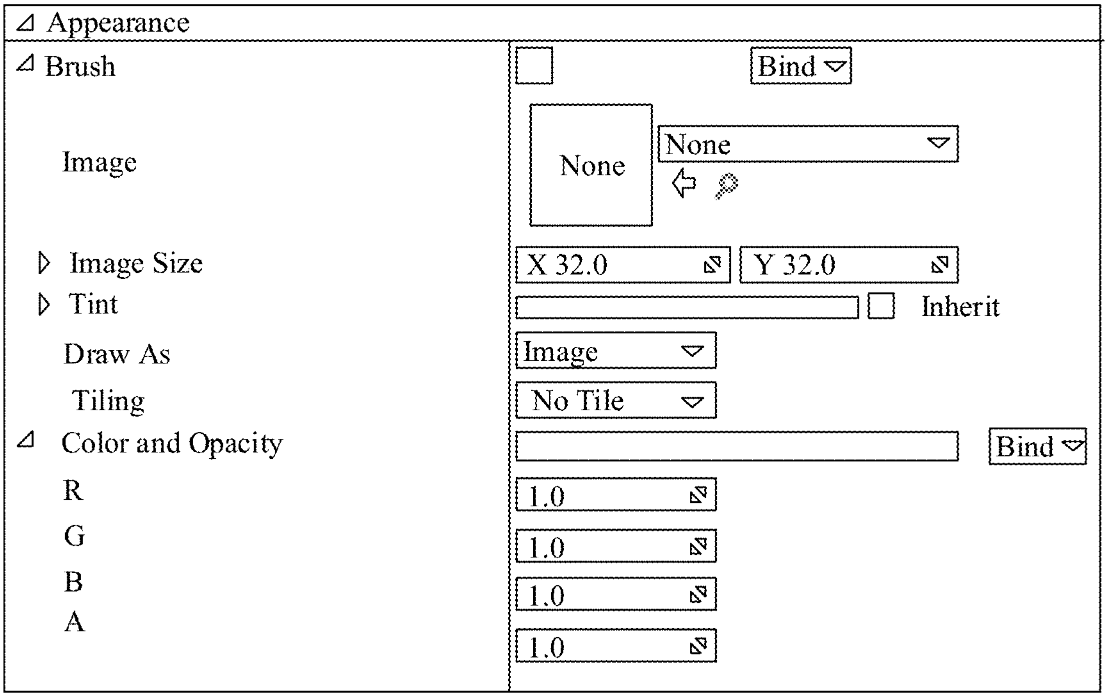
FIG. 3 is a schematic diagram of an UMG blueprint according to an embodiment of this disclosure.

For example, an example of adding an image resource to a game interface is used. When the game interface is created by using UMG, a UMG blueprint may be first created. An image component Image is added to the UMG blueprint. An image is attached to a brush/image node of the shown image component, to bind the attached image UMG, as shown in FIG. 3. In this case, during the creation of the UMG of the game interface, the image is strongly bound to the UMG. That is, the UMG has strong reference with the image.

According to interface opening logic in the related art, when it is requested to open an interface, all resources with strong reference need to be loaded first, and the interface can be opened only after the resources have been completely loaded. Because images are bound together to UMG, in this case, when the UMG is opened during gaming, these bound image resources are loaded together, and the following case may occur: If a large quantity of image resources (image resources with strong reference) need to be loaded, according to a loading procedure, in this case, it takes a relatively long time to load the image resources, and as a result it takes a long time to open an interface. The excessively long time severely affects the gaming experience of the user.

To resolve the foregoing technical problem, in this embodiment, for all media resources of the to-be-processed interface, some media resources may be synchronously loaded, and the remaining media resources may be asynchronously loaded. Regardless of whether asynchronously loaded media resources have been loaded, interface processing may be performed after the synchronously loaded media resources have been loaded. Because resource sizes of asynchronously loaded media resources are greater than a preset threshold, a quantity of media resources that need to be loaded to display the interface can be greatly reduced, so that a time length of opening the interface is shortened, and the efficiency of opening the interface is improved, thereby improving the use experience of the user.

In this embodiment, the user may perform a trigger operation on the terminal device of the user to trigger the opening of the to-be-processed interface. The terminal device may generate, in response to the detected trigger operation, an interface display instruction configured for requesting to display the to-be-processed interface, so that the terminal device may acquire the interface display instruction. The trigger operation may be one operation or a combination of a plurality of operations, and may include, but not limited to, at least one of the following operations: a single-tap operation, a double-tap operation, a swipe operation, a gesture operation, and the like. The trigger operation may be detected by a touch screen of the terminal device, or may be received from an input/output device (for example, a keyboard, a mouse, a remote control, and the like) through an input/output port. In some embodiments, the interface display instruction may be received by the terminal device from another device (for example, a server, or another terminal device). In this embodiment, a manner of acquiring the interface display instruction is not limited.

S204: Load, in a case that it is determined that a first group of media resources exist in a to-be-loaded media resource set in the to-be-processed interface, a second group of media resources other than the first group of media resources in the media resource set in response to the interface display instruction, a resource size of each media resource of the first group of media resources being greater than a preset threshold. In an example, when a media resource set of the user interface includes a first group of media resources and a second group of media resources that is different from the first group of media resources, the second group of media resources in the media resource set is loaded based on the interface display instruction, a resource size of each media resource of the first group of media resources being greater than a threshold.

In response to the acquired interface display instruction, the terminal device may first determine the to-be-loaded media resource set in the to-be-processed interface, that is, a set of media resources that need to be loaded to display the to-be-processed interface. The to-be-loaded media resource set may include one or more types of media resources, for example, media resources that need to be loaded before the to-be-processed interface is displayed, and media resources that do not need to be loaded before the to-be-processed interface is displayed. If the first group of media resources (that is, a media resource group of media resources that do not need to be loaded before the to-be-processed interface is displayed) exist in the to-be-loaded media resource set, the terminal device may load the second group of media resources other than the first group of media resources in the media resource set in response to the interface display instruction.

In a possible implementation, a media resource condition may be preset. The media resource condition may include, but not limited to, at least one of the following: a condition that needs to be met by the media resources that need to be loaded before the to-be-processed interface is displayed, and a condition that needs to be met by the media resources that do not need to be loaded before the to-be-processed interface is displayed. The condition may include a condition corresponding to a resource size, and may further include a condition of another type, for example, a condition corresponding to a resource type, and the like. According to a preset media resource condition, the terminal device may determine whether the first group of media resources exist in the to-be-loaded media resource set. The resource size of each media resource in the first group of media resources here is greater than the preset threshold. The preset threshold may be preset, for example, 1M, 2M or another value.

The first group of media resources may be asynchronously loaded media resources, and the second group of media resources may be synchronously loaded media resources. The to-be-processed interface is displayed after the second group of media resources have been completely loaded, and it is not necessary to wait for the first group of media resources to be completely loaded. The media resources in the second group of media resources may be loaded in parallel, or may be loaded in series, provided that it can be ensured that all the second group of media resources have been loaded. The media resources in the first group of media resources may be loaded in parallel, or may be loaded in series, and may start to be loaded after the to-be-processed interface is displayed, or may start to be loaded in response to the interface display instruction. In this embodiment, loading manners and loading occasions of the first group of media resources and the second group of media resources are not limited.

The resource size of each media resource in the first group of media resources is greater than the preset threshold, and the resource size of each media resource in the second group of media resources may be less than or equal to the preset threshold or may be greater than the preset threshold. For example, the first group of media resources may include media resources whose resource size is greater than the preset threshold in media resources of a specified resource type. Media resources whose resource size is less than or equal to the preset threshold in the media resources of the specified resource type and media resources of other resource types may all belong to the second group of media resources.

Figure 4:
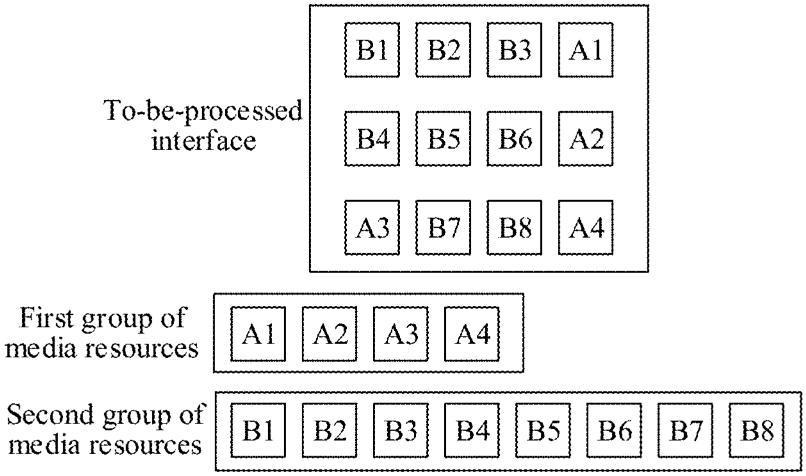
FIG. 4 is a schematic diagram of an to-be-processed interface according to an embodiment of this disclosure.

For example, as shown in FIG. 4, the to-be-loaded media resource set in the to-be-processed interface includes media resources A1 to A4 and B1 to B8. The first group of media resources include A1 to A4. The second group of media resources include B1 to B8. The resource size of each media resource of A1 to A4 is greater than the preset threshold. The resource size of each media resource of B1 to B8 may be less than or equal to the preset threshold, or resource sizes of some media resources are less than or equal to the preset threshold, and resource sizes of some media resources are greater than the preset threshold.

S206: Display the to-be-processed interface including the second group of media resources in a case that it is determined that the second group of media resources have been loaded and none of the first group of media resources has been loaded. In an example, the user interface is displayed with the second group of media resources when the second group of media resources are loaded and before the first group of media resources is loaded.

After the second group of media resources have been loaded, regardless of whether the first group of media resources have been loaded, the to-be-processed interface is displayed. The terminal device may display the to-be-processed interface including the second group of media resources in a case that the second group of media resources have been loaded and none of the first group of media resources has been loaded. For example, after all media resources that need to be synchronously loaded have been loaded, even if any asynchronously loaded media resource has not been loaded, the to-be-processed interface is displayed on the terminal device.

During the loading of any media resource, the loading may be performed based on a resource component corresponding to the media resource. For a media resource that has been loaded, the media resource may be displayed in a display area corresponding to the media resource in the to-be-processed interface. An area parameter of a display area corresponding to each media resource may be fixed. The area parameter here may include at least one of the following: an area position, an area size, a layer in which an area is located, and the like. The display area corresponding to each media resource may be fixed, or may be variable. Display areas corresponding to different media resources may not overlap, or may partially overlap or completely overlap. This is not limited in this embodiment.

Figure 5:
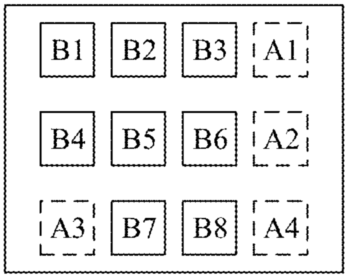
FIG. 5 is a schematic diagram of another to-be-processed interface according to an embodiment of this disclosure.

For example, when the second group of media resources (that is, B1 to B8) have been completely loaded, none of the media resources in the first group of media resources (that is, A1 to A4) has been loaded. In this case, the to-be-processed interface may be directly displayed, as shown in FIG. 5. On the displayed to-be-processed interface, the second group of media resources may be only displayed in the corresponding display area, or replacement media resources of all or some media resources in the second group of media resources and the first group of media resources may be displayed.

S208: Display the first group of media resources in the to-be-processed interface in a case that the to-be-processed interface including the second group of media resources is displayed and in a case that it is determined that the first group of media resources have been loaded. In an example, the first group of media resources is displayed in the user interface with the second group of media resources when the first group of media resources is loaded.

In this embodiment, while the to-be-processed interface including the second group of media resources is displayed, the first group of media resources may be continuously loaded. The first group of media resources may start to be loaded before the to-be-processed interface including the second group of media resources is displayed, or may start to be loaded after the to-be-processed interface including the second group of media resources is displayed. After the first group of media resources have been loaded, the first group of media resources may be displayed in the to-be-processed interface, that is, a to-be-processed interface including the first group of media resources and the second group of media resources is displayed. The eventually displayed to-be-processed interface may be shown in FIG. 4.

Different media resources in the first group of media resources may have been loaded at different moments. The first group of media resources may be displayed in the to-be-processed interface after all media resources in the first group of media resources have been loaded. Alternatively, after any media resource in the first group of media resources has been loaded, the loaded media resource in the first group of media resources may be displayed in the to-be-processed interface. That is, a to-be-processed interface including the loaded media resource in the first group of media resources and the second group of media resources is displayed.

After the to-be-processed interface including the second group of media resources is displayed, the terminal device may detect an interface closing operation performed in the to-be-processed interface. If a media resource that has not been loaded exists in the first group of media resources in this case, the loading of these media resources may be stopped, or the loaded media resource in the first group of media resources may be kept in or deleted from the internal memory of the terminal device. For a case in which the loaded media resource is kept in the first group of media resources, the internal memory may be directly searched for the loaded media resource in the first group of media resources when the to-be-processed interface is opened a next time, and only a media resource that is not found is loaded. In a possible implementation, the media resource that has not been loaded in the first group of media resources may continue to be loaded, to obtain the first group of media resources that have been loaded. The first group of media resources that have been loaded may be saved in the internal memory of the terminal device, making it convenient to directly read the first group of media resources from the internal memory when the to-be-processed interface is opened a next time.

For the second group of media resources, the second group of media resources may be kept in or deleted from the internal memory of the terminal device. For a case in which the second group of media resources are kept, the internal memory may be directly searched for the second group of media resources when the to-be-processed interface is opened a next time, and in a case that it is determined that the second group of media resources have all been found, the to-be-processed interface including the second group of media resources is directly displayed, or, the to-be-processed interface including the second group of media resources and the found media resources in the first group of media resources is displayed, or, the to-be-processed interface including the second group of media resources, the found media resources in the first group of media resources, and the loaded media resources in the first group of media resources is displayed.

In a possible implementation, for a scenario in which all or some media resources in the to-be-processed interface are kept, to reduce the occupation of a space in the internal memory, the media resources in the to-be-processed interface in the internal memory may be deleted in a case that a resource deletion condition is detected. For example, all or some loaded media resources in the first group of media resources are deleted, and the second group of media resources are deleted. The resource deletion condition may include at least one of the following: the remaining space of the internal memory is less than or equal to a preset space threshold, and a continuous time length for which the to-be-processed interface is not opened reaches a preset continuous time length. A processing process when the to-be-processed interface is closed is not limited in this embodiment.

Through the embodiments provided in this disclosure, an interface display instruction is acquired, the interface display instruction being configured for requesting to display a to-be-processed interface. In a case that it is determined that a first group of media resources exist in a to-be-loaded media resource set in the to-be-processed interface, a second group of media resources other than the first group of media resources in the media resource set are loaded in response to the interface display instruction, a resource size of each media resource of the first group of media resources being greater than a preset threshold. The to-be-processed interface including the second group of media resources is displayed in a case that it is determined that the second group of media resources have been loaded and none of the first group of media resources has been loaded. The first group of media resources in the to-be-processed interface are displayed in a case that the to-be-processed interface including the second group of media resources is displayed and in a case that it is determined that the first group of media resources have been loaded. A problem that it is necessary to load an excessively large quantity of resources to open an interface and as a result it takes an excessively long time to open the interface in the related art is resolved, thereby shortening a time required to display the interface, and improving the completeness of information display.

In an example solution, the foregoing method further includes the following steps:

S11: Load the first group of media resources, where the first group of media resources are loaded in response to the interface display instruction, or, loaded after the to-be-processed interface is displayed.

In this embodiment, there may be a variety of loading occasions for the first group of media resources. For example, the first group of media resources may start to be loaded in response to the interface display instruction. In the foregoing loading manner, a time required to display only the second group of media resources or display only the second group of media resources and some media resources in the first group of media resources in the to-be-processed interface can be shortened. In another example, the first group of media resources may start to be loaded only after the to-be-processed interface is displayed. Because particular software and hardware resources need to be occupied to load media resources, a time required to load the second group of media resources is increased. Therefore, in the foregoing loading manner, the speed of displaying the interface can be increased.

Figure 6:
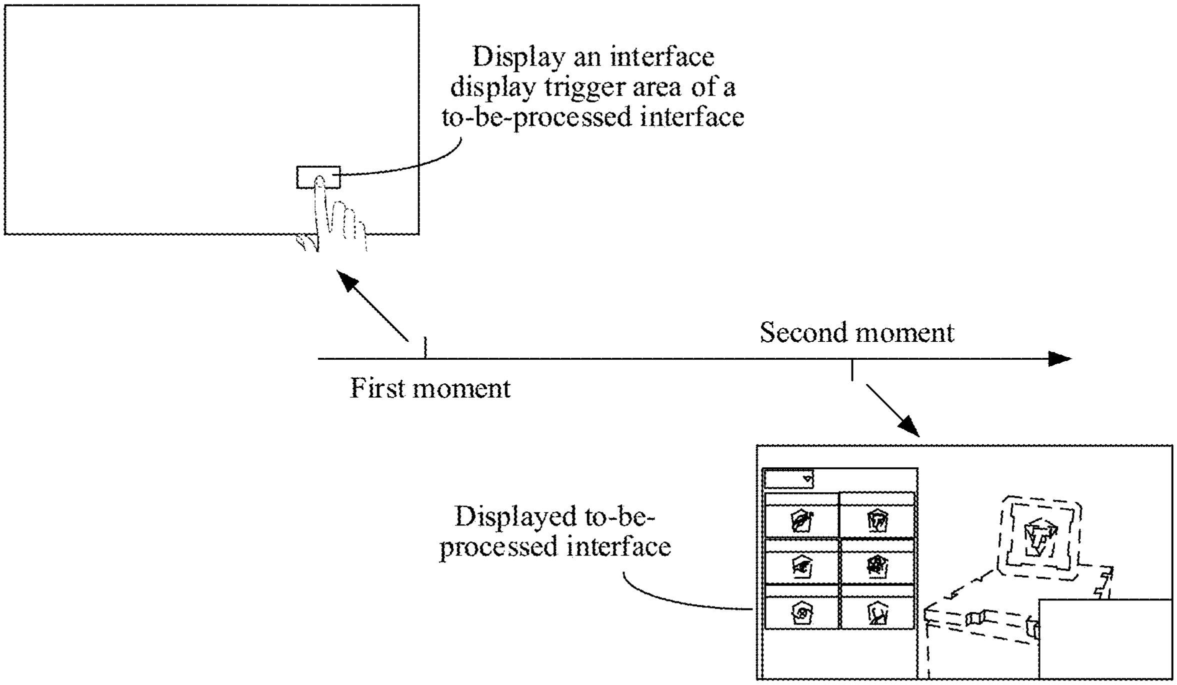
FIG. 6 is a schematic diagram of an interface processing method according to an embodiment of this disclosure.

For example, as shown in FIG. 6, the interface display instruction for the to-be-processed interface is acquired at a first moment, and the first group of media resources may start to be loaded when the interface display instruction is acquired, or the first group of media resources may start to be loaded at a second moment, that is, after the to-be-processed interface is displayed.

Through the embodiments provided in this disclosure, asynchronously loaded media resources are loaded in response to the interface display instruction, or asynchronously loaded media resources are loaded after the to-be-processed interface is displayed, the flexibility of loading resources can be improved.

In an example solution, after the acquiring an interface display instruction, the foregoing method further includes the following step:

S21: Load, in a case that it is determined that a first media resource in the first group of media resources has a first replacement resource, the first replacement resource in response to the interface display instruction, where the first replacement resource is configured for being displayed in place of the first media resource in a first display area, and the first display area is a display area corresponding to the first media resource in the to-be-processed interface.

For a case in which a media resource that has not been loaded exists in the first group of media resources when the second group of media resources have been loaded, no information may be displayed in the to-be-processed interface and a display area corresponding to the media resource, that is, a blank is displayed. However, regardless of synchronous loading or asynchronous loading, a time is required to load a media resource (for example, an image resource). In this case, within the period of time for loading the first group of media resources, if a blank is displayed in the display area corresponding to the first group of media resources in the to-be-processed interface, a short blank time does not significantly affect the visual experience (for example, the gaming experience) of the user. However, when the blank time is relatively long, the visual experience of the user is affected.

In this embodiment, to improve the visual experience of the user, corresponding replacement media resources may be configured for all or some media resources in the first group of media resources. The replacement media resources here are configured for being displayed in place of replaced media resources in a corresponding display area. For example, a corresponding level of detail (LOD) image may be configured for image resources in the to-be-processed interface. For example, one LOD image is bound to a component corresponding to an image. The LOD image is designed with a small specification, and may be strongly bound to corresponding UMG. Image resources of the LOD image are relatively small, and the loading speed is fast, so that the visual perception of the user is not affected.

The LOD image here may be a replacement image resource that is generated for an image resource by using an LOD technique. The LOD technique is to reduce a quantity of faces of a model, and replace a far object with a model with a small quantity of faces in real time, so that the performance can be improved. Alternatively, the LOD image may be a thumbnail of the image resource, an image obtained by adjusting the definition, contrast, or another image parameter of the image resource, or the like, provided that it is met that a size (an image size) of the LOD image is less than or equal to the preset threshold.

In this embodiment, if the first media resource in the first group of media resources has the first replacement resource, the first replacement resource may be loaded in response to the interface display instruction. The first media resource here may be all or some media resources in the first group of media resources, or may be one or more media resources with a large resource size in the first group of media resources, or may be one or more media resources with a low resource loading priority in the first group of media resources. The first replacement resource may be configured for being displayed in place of the first media resource in the first display area.

Correspondingly, the displaying the to-be-processed interface including the second group of media resources in a case that it is determined that the second group of media resources have been loaded and none of the first group of media resources has been loaded includes the following step:

S22: Display the to-be-processed interface including the second group of media resources and the first replacement resource in a case that it is determined that the second group of media resources and the first replacement resource have been loaded and none of the first group of media resources has been loaded.

To improve the visual experience of the user, it may be configured that the first replacement resource is a media resource that needs to be loaded before the to-be-processed interface is displayed, and may be a synchronously loaded media resource. After the second group of media resources and the first replacement resource have been loaded, even if none of the first group of media resources has been loaded, the to-be-processed interface including the second group of media resources and the first replacement resource may be directly displayed on the terminal device.

Figure 7:
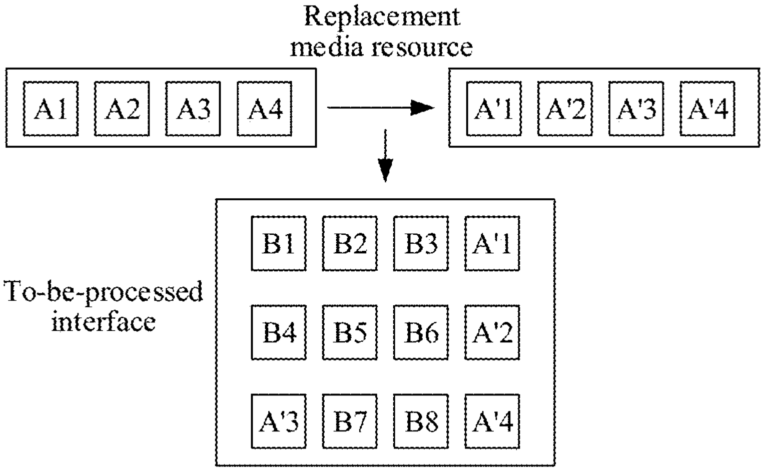
FIG. 7 is a schematic diagram of still another to-be-processed interface according to an embodiment of this disclosure.

For example, a group of replacement media resources corresponding to the first group of media resources A1 to A4 are A'1 to A'4 (that is, the first replacement resources). After A'1 to A'4 and B1 to B8 have been loaded, the to-be-processed interface may be displayed. The displayed to-be-processed interface is shown in FIG. 7. A'1 to A'4 are respectively displayed in the first display areas corresponding to A1 to A4.

Through the embodiments provided in this disclosure, replacement media resources (for example, the first replacement resources) of asynchronously loaded media resources are configured, and the to-be-processed interface is displayed after the synchronously loaded media resources and the replacement media resources have been loaded, so that a case that a large quantity of blanks appear in the interface or a time of blanks is long can be avoided, thereby improving the visual experience of the user.

In an example solution, the displaying the first group of media resources in the to-be-processed interface in a case that the to-be-processed interface including the second group of media resources is displayed and in a case that it is determined that the first group of media resources have been loaded includes the following step:

S31: Display the first media resource in the first group of media resources in place of the first replacement resource in the first display area in a case that the to-be-processed interface including the second group of media resources and the first replacement resource is displayed and in a case that it is determined that the first group of media resources have been loaded.

The first replacement resources are media resources configured for being displayed in place of the first media resources in the to-be-processed interface and are not actual first media resources. The resource sizes of the replacement media resources are relatively small (for example, less than or equal to the preset threshold). Compared with the replaced media resources, the richness of displayed information of the replacement media resources is insufficient. For example, compared with corresponding media resources with great details, the model level of the replacement media resources is low, and the display of the details lacks the richness, affecting the visual experience of the user.

In this embodiment, to improve the visual experience of the user, after the to-be-processed interface including the second group of media resources and the first replacement resource is displayed, when the first media resource has been loaded, the terminal device may display the first media resource in place of the first replacement resource in the first display area. Because the first media resource is also displayed in the first display area, the visual impact on the user is small, and the user may perceive that the quality of the displayed media resource in the first display area is improved.

For example, while the LOD image is displayed in place of an original image resource in the to-be-processed interface, the original image resource may be asynchronously loaded at the background, and after the original image resource has been loaded, the original image resource is displayed in place of the LOD image.

Through the embodiments provided in this disclosure, the asynchronously loaded media resources have been loaded and are displayed in place of the replacement media resources displayed in the corresponding display areas in the to-be-processed interface, the richness of the displayed interface information can be improved, thereby improving the visual experience of the user.

In an example solution, after the loading a second group of media resources other than the first group of media resources in the media resource set in response to the interface display instruction, the foregoing method further includes:

S41: Display, in a case that it is determined that the second group of media resources have been loaded and a third group of media resources in the first group of media resources have been loaded, the to-be-processed interface including the second group of media resources and the third group of media resources.

S42: Display, in a case that the target interface including the second group of media resources and the third group of media resources is displayed and in a case that it is determined that a fourth group of media resources other than the third group of media resources in the first group of media resources have been loaded, the fourth group of media resources in the to-be-processed interface.

In this embodiment, the first group of media resources may be loaded in response to the interface display instruction. If the second group of media resources have been loaded, there may be a plurality of loading cases of the first group of media resources, for example, no media resource has been loaded, some media resources have been loaded, and media resources have been completely loaded. In a case that some media resources have been loaded, if the third group of media resources in the first group of media resources have been loaded when the second group of media resources have been loaded, the terminal device may display the to-be-processed interface including the second group of media resources and the third group of media resources. The third group of media resources here are some media resources in the first group of media resources, and may be media resources that are historically loaded into the internal memory, or may be media resources loaded after the interface display instruction is acquired.

Figure 8:
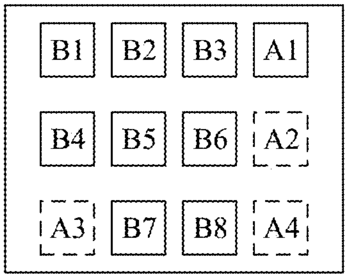
FIG. 8 is a schematic diagram of still another to-be-processed interface according to an embodiment of this disclosure.

For example, if A1 and A2 (an example of the third group of media resources) in the first group of media resources have been loaded when the second group of media resources B1 to B8 have been loaded, a to-be-processed interface including B1 to B8 and A1 and A2 may be displayed, as shown in FIG. 8.

In this embodiment, while the to-be-processed interface including the second group of media resources and the third group of media resources is displayed, the fourth group of media resources may be continuously loaded. The fourth group of media resources may start to be loaded before the to-be-processed interface including the second group of media resources and the third group of media resources is displayed, or may start to be loaded after the to-be-processed interface including the second group of media resources and the third group of media resources is displayed. After the fourth group of media resources have been loaded, the fourth group of media resources may be displayed in the to-be-processed interface, that is, a to-be-processed interface including the first group of media resources and the second group of media resources is displayed.

Different media resources in the fourth group of media resources may have been loaded at different moments. The fourth group of media resources may be displayed in the to-be-processed interface after all media resources in the fourth group of media resources have been loaded. Alternatively, after any media resource in the fourth group of media resources has been loaded, the loaded media resource in the fourth group of media resources may be displayed in the to-be-processed interface. That is, a to-be-processed interface including the loaded media resource in the first group of media resources and the second group of media resources is displayed.

After the to-be-processed interface including the second group of media resources and the third group of media resources is displayed, the terminal device may detect an interface closing operation performed in the to-be-processed interface. If a media resource that has not been loaded exists in the fourth group of media resources in this case, the loading of these media resources may be stopped, or the loaded media resource (including the third group of media resources and the loaded part in the fourth group of media resources) in the first group of media resources may be kept in or deleted from the internal memory of the terminal device. For a case in which the loaded media resource is kept in the first group of media resources, the internal memory may be directly searched for the loaded media resource in the first group of media resources when the to-be-processed interface is opened a next time, and only a media resource that is not found is loaded. In a possible implementation, the media resource that has not been loaded in the fourth group of media resources may continue to be loaded, to obtain the first group of media resources that have been loaded. The first group of media resources that have been loaded may be saved in the internal memory of the terminal device, making it convenient to directly read the first group of media resources from the internal memory when the to-be-processed interface is opened a next time.

For the second group of media resources, the second group of media resources may be kept in or deleted from the internal memory of the terminal device. For a case in which the second group of media resources are kept, the internal memory may be directly searched for the second group of media resources when the to-be-processed interface is opened a next time, and in a case that it is determined that the second group of media resources have all been found, the to-be-processed interface including the second group of media resources is directly displayed, or, the to-be-processed interface including the second group of media resources and the found media resources in the first group of media resources is displayed, or, the to-be-processed interface including the second group of media resources, the found media resources in the first group of media resources, and the loaded media resources in the first group of media resources is displayed.

In a possible implementation, for a scenario in which all or some media resources in the to-be-processed interface are kept, to reduce the occupation of a space in the internal memory, the media resources in the to-be-processed interface in the internal memory may be deleted in a case that a resource deletion condition is detected. For example, all or some loaded media resources in the first group of media resources are deleted, and the second group of media resources are deleted. The resource deletion condition is similar to that in the foregoing embodiments. Details are not described herein.

Through the embodiments provided in this disclosure, when the synchronously loaded media resources (for example, the second group of media resources) have been loaded, the synchronously loaded media resources and the asynchronously loaded media resources (for example the third group of media resources) that have been loaded are displayed in the to-be-processed interface, and after the remaining asynchronously loaded media resources (for example, the fourth group of media resources) have been loaded, the remaining asynchronously loaded media resources are displayed in the to-be-processed interface, so that while the time required to display the interface is shortened, and the completeness of the displayed interface is ensured.

In an example solution, after the acquiring an interface display instruction, the foregoing method further includes the following step:

S51: Search internal memory for the first group of media resources in response to the interface display instruction.

S52: Determine historical media resources that are found from the internal memory and belong to the first group of media resources as the third group of media resources.

When the to-be-processed interface is opened for the first time, the media resource set in the interface is loaded into the internal memory, to display the to-be-processed interface. For the loaded media resource set, when the to-be-processed interface is closed or within a period of time after the interface is closed, all or some media resources loaded into the internal memory may be kept; or, before the to-be-processed interface is opened, all or some media resources in the interface may be preloaded. Compared with loading media resources into the internal memory, searching the internal memory for media resources has higher efficiency.

In this embodiment, in response to the acquired interface display instruction, the terminal device may first search the internal memory for the historically loaded first group of media resources (that is, historical media resources), and media resources that can be found may be all or some media resources in the first group of media resources, or no media resource in the first group of media resources may be found. The foregoing third group of media resources includes the historical media resources that are in the first group of media resources and are found from the internal memory.

For example, for the to-be-processed interface shown in FIG. 8, A1 in the first group of media resources may be a historical media resource found from the internal memory.

The second group of media resources may be loaded in a manner of searching the internal memory first and synchronously loading an unfound media resource, or may be directly synchronously loaded (in this case, the second group of media resources may not be saved in the internal memory). This is not limited in this embodiment.

Through the embodiments provided in this disclosure, media resources (for example, the first group of media resources) that need to be asynchronously loaded are found from the internal memory, and the found media resources are directly displayed in the to-be-processed interface, so that a time required to load media resources can be shortened, thereby improving the efficiency of loading media resources.

In an example solution, after the acquiring an interface display instruction, the foregoing method further includes the following step:

S61: Load other media resources than the historical media resources in the first group of media resources in response to the interface display instruction, where the third group of media resources further include media resources that have been loaded in the other media resources when the second group of media resources have been loaded.

In this embodiment, the other media resources than the historical media resources in the first group of media resources may be loaded after the to-be-processed interface is opened, or, may be directly asynchronously loaded without waiting for the to-be-processed interface to be opened first. The loading manner of other media resources is similar to that in the foregoing embodiments. Details are not described herein in this embodiment.

For the case in which the other media resources are loaded after the to-be-processed interface is opened, the third group of media resources are the foregoing historical media resources found from the internal memory. For the case of direct asynchronous loading, when the second group of media resources have been loaded, none of the other media resources may have been loaded, or at least some of the other media resources may have been loaded. For the case in which that none of the other media resources may have been loaded, the third group of media resources are the foregoing historical media resources found from the internal memory. For the case in which at least some of the other media resources have been loaded, the third group of media resources include the historical media resources found from the internal memory and the media resources that have been loaded in the other media resources when the second group of media resources have been loaded.

For example, for the to-be-processed interface shown in FIG. 8, the other media resources include A2, A3, and A4. A2 may be a media resource that has been loaded in the other media resources when the second group of media resources have been loaded.

Through the embodiments provided in this disclosure, media resources (for example, other media resources than the historical media resources in the first group of media resources) that are in the asynchronously loaded media resources and are not found from the internal memory are directly loaded in response to the interface display instruction, so that the richness of the displayed interface information can be improved, thereby improving the visual experience of the user.

In an example solution, after the acquiring an interface display instruction, the foregoing method further includes the following step:

S71: Load, in a case that it is determined that a second media resource in the first group of media resources has a second replacement resource, the second replacement resource in response to the interface display instruction, where the second replacement resource is configured for being displayed in place of the second media resource in a second display area, the second media resource is a media resource other than the historical media resources in the first group of media resources, and the second display area is a display area corresponding to the second media resource in the to-be-processed interface.

For a case in which a media resource that has not been loaded exists in the first group of media resources when the second group of media resources have been loaded, no information may be displayed in the to-be-processed interface and a display area corresponding to the media resource, that is, a blank is displayed. However, similar to that in the foregoing embodiments, if the blank time is long, affecting the visual experience of the user.

In this case, for other media resources that are in the first group of media resources and are not found from the internal memory, it may be determined whether the media resources have replacement media resources. The meaning of the replacement media resource is similar to that in the foregoing embodiments. Details are not described herein. If the second media resource other than the historical media resource in the first group of media resources has the second replacement resource, the second replacement resource may be loaded in response to the interface display instruction. The second media resource here may be all or some media resources in the other media resources, or may be one or more media resources with a large resource size in the first group of media resources, or may be one or more media resources with a low resource loading priority in the first group of media resources. The second replacement resource may be configured for being displayed in place of the second media resource in the second display area.

Correspondingly, the displaying, in a case that it is determined that the second group of media resources have been loaded and a third group of media resources in the first group of media resources have been loaded, the to-be-processed interface including the second group of media resources and the third group of media resources includes the following step:

S72: Display the to-be-processed interface including the second group of media resources, the third group of media resources, and the second replacement resource in a case that it is determined that the second group of media resources, the second replacement resource, and the third group of media resources have been loaded and the third group of media resources do not include the second media resource.

To improve the visual experience of the user, it may be configured that the second replacement resource is a media resource that needs to be loaded before the to-be-processed interface is displayed, and may be a synchronously loaded media resource. After the second group of media resources and the second replacement resource have been loaded, even if none of the other media resources has been loaded, the to-be-processed interface including the second group of media resources, the first replacement resource, and the historical media resource may be directly displayed on the terminal device. In addition, even if the third group of media resources include the media resources that have been loaded in the other media resources when the second group of media resources have been loaded, if the media resources that have been loaded in the other media resources do not include the second media resource, the terminal device may display the to-be-processed interface including the second group of media resources, the third group of media resources, and the second replacement resource.

Figure 9:
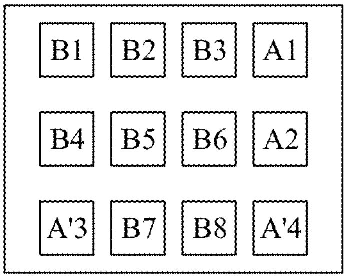
FIG. 9 is a schematic diagram of still another to-be-processed interface according to an embodiment of this disclosure.

For example, in the first group of media resources A1 to A4, media resources having corresponding replacement media resources include A3 and A4 (an example of the second media resources), the corresponding replacement media resources are respectively A'3 and A'4 (an example of the second replacement resources). The third group of media resources include A1 and A2. After A1 and A2, A'3 and A'4, and B1 to B8 have been loaded, a to-be-processed interface including A1 and A2, A'3 and A'4, and B1 to B8 may be displayed. The displayed to-be-processed interface is shown in FIG. 9.

In a possible implementation, if the third group of media resources include some media resources in the second media resources, it may be determined that the second media resources are not media resources that belong to the third group of media resources, and a sub-media resource is obtained. The terminal device may display a to-be-processed interface including the second group of media resources, the third group of media resources, and the third replacement resource. The third replacement resource is a replacement resource that is in the second replacement resource and that corresponds to the sub-media resource.

For example, in the first group of media resources A1 to A4, media resources having corresponding replacement media resources include A1 to A4. A1 is a media resource found from the internal memory, A2 to A4 are the second media resources, and the corresponding replacement media resources are respectively A'2 to A'4 (an example of the second replacement resource). The third group of media resources include A1 and A2. The sub-media resources are A3 and A4. After A1 and A2, A'3 and A'4, and B1 to B8 have been loaded, a to-be-processed interface including A1 and A2, A'3 and A'4, and B1 to B8 may be displayed. The displayed to-be-processed interface is shown in FIG. 9.

Through the embodiments provided in this disclosure, replacement media resources (for example, the second replacement resources) of asynchronously loaded media resources are configured, and the to-be-processed interface is displayed after the synchronously loaded media resources and the replacement media resource have been loaded, so that a case that a large quantity of blanks appear in the interface or a time of blanks is long can be avoided, thereby improving the visual experience of the user.

In an example solution, the displaying, in a case that the to-be-processed interface including the second group of media resources and the third group of media resources is displayed and in a case that it is determined that a fourth group of media resources other than the third group of media resources in the first group of media resources have been loaded, the fourth group of media resources in the to-be-processed interface includes:

S81: Display the second media resource in place of the second replacement resource in the second display area in a case that the to-be-processed interface including the second group of media resources, the third group of media resources, and the second replacement resource is displayed and in a case that it is determined that the second media resource has been loaded, where the fourth group of media resources include the second media resource.

The second replacement resources are media resources configured for being displayed in place of the second media resources in the to-be-processed interface and are not actual second media resources. The resource sizes of the replacement media resources are relatively small. Compared with the replaced media resources, the richness of displayed information of the replacement media resources is insufficient. For example, compared with corresponding media resources with great details, the model level of the replacement media resources is low, and the display of the details lacks the richness, affecting the visual experience of the user.

In this embodiment, to improve the visual experience of the user, after the to-be-processed interface including the second group of media resources, the third group of media resources, and the second replacement resource is displayed, when the second media resource has been loaded, the terminal device may display the second media resource in place of the second replacement resource in the second display area. Because the second media resource is also displayed in the second display area, the visual impact on the user is small, and the user may perceive that the quality of the displayed media resource in the second display area is improved.

Through the embodiments provided in this disclosure, the asynchronously loaded media resources (for example, the second media resources) have been loaded and are displayed in place of the replacement media resources (for example, the second replacement resources) displayed in the corresponding display areas in the to-be-processed interface, the richness of the displayed interface information can be improved, thereby improving the visual experience of the user.

Through the embodiments provided in this disclosure, after media resources have been asynchronously loaded, the media resources may be displayed in the interface in place of corresponding replacement resources, thereby improving the fineness of interface display.

In an example solution, after the loading a second group of media resources other than the first group of media resources in the media resource set in response to the interface display instruction, the foregoing method further includes:

S91: Display the to-be-processed interface including the second group of media resources and the first group of media resources in a case that it is determined that the second group of media resources have been loaded and all the first group of media resources have been loaded.

In this embodiment, the first group of media resources may be loaded in response to the interface display instruction. When the second group of media resources have been loaded, the loading case of the first group of media resources may be that all media resources have been completely loaded. In this case, the terminal device may display the to-be-processed interface including the second group of media resources and the first group of media resources, that is, display the complete to-be-processed interface.

For example, if all the media resources in the first group of media resources have been loaded when the second group of media resources B1 to B8 have been loaded, a to-be-processed interface including B1 to B8 and A1 to A4 may be displayed, as shown in FIG. 4.

Through the embodiments provided in this disclosure, if the asynchronously loaded media resources (for example, the first group of media resources) have also been loaded when the synchronously loaded media resources (for example, the second group of media resources) have been loaded, the two types of media resources that have been loaded are directly displayed, so that the efficiency of interface display can be improved.

In an example solution, after the acquiring an interface display instruction, the foregoing method further includes the following step:

S101: Determine media resources whose resource type is a preset resource type and whose resource size is greater than the preset threshold in the media resource set as the first group of media resources.

In this embodiment, the determined media resources whose resource type is a preset resource type and whose resource size is greater than the preset threshold in the media resource set may be determined as the first group of media resources according to the foregoing preset threshold. The preset resource type here may be media resources that allow asynchronous loading, and may include one or more resource types, for example, an image resource, an animation resource, and the like.

Through the embodiments provided in this disclosure, media resources (for example, the first group of media resources) that need to be asynchronously loaded are determined according to a resource type and a resource size, so that the appropriateness of loading media resources can be improved.

In an example solution, after the acquiring an interface display instruction, the foregoing method further includes the following steps:

S111: Acquire resource description information corresponding to the to-be-processed interface in response to the interface display instruction, where the resource description information is configured for describing a resource attribute of a media resource included in the to-be-processed interface, and the resource attribute includes a resource size.

S112: Determine the media resource set, the first group of media resources, and the second group of media resources according to the resource description information.

In this embodiment, the interface display instruction may carry an interface identifier of a to-be-displayed to-be-processed interface, and the to-be-displayed to-be-processed interface may be determined according to the interface identifier carried in the interface display instruction. To quickly determine media resources included in the to-be-displayed interface, corresponding resource description information may be configured for each interface in advance. The resource description information corresponding to each interface is configured for describing a resource attribute of a media resource included in each interface. The resource attribute may include a resource size, or may include one or more types of other resource attributes, for example, a resource type, a resource name, and the like. This is not limited in this embodiment.

The terminal device may acquire the resource description information corresponding to the to-be-processed interface according to the interface identifier of the to-be-processed interface. The resource description information corresponding to the to-be-processed interface may be configured for describing a resource attribute of a media resource included in the to-be-processed interface, and the resource attribute may include, but not limited to, a resource size. A media resource set in the to-be-processed interface may be determined according to the resource description information corresponding to the to-be-processed interface. The first group of media resources and the second group of media resources in the media resource set are determined according to resource attribute information such as resource sizes of the media resources in the media resource set.

Through the embodiments provided in this disclosure, the media resources in the to-be-displayed interface and media resources (for example, the second group of media resources) that need to be synchronously loaded and media resources (for example, the first group of media resources) that need to be asynchronously loaded in the media resources are determined according to interface description information, so that the efficiency of interface display can be improved.

The interface processing method of the to-be-processed interface in the embodiments of this disclosure is described below with reference to an example. In this example, the to-be-processed interface is a game interface, the asynchronously loaded media resources are image resources, and the replacement media resources are LOD images.

This example provides a UE4-based scheme for improving the loading speed of a game interface. When the game interface is opened, images that affect the loading speed are not loaded immediately, but instead are loaded in an asynchronous loading manner later. In the foregoing manner, the speed of opening the interface can be improved, thereby improving the gaming experience of the user.

Figure 10:
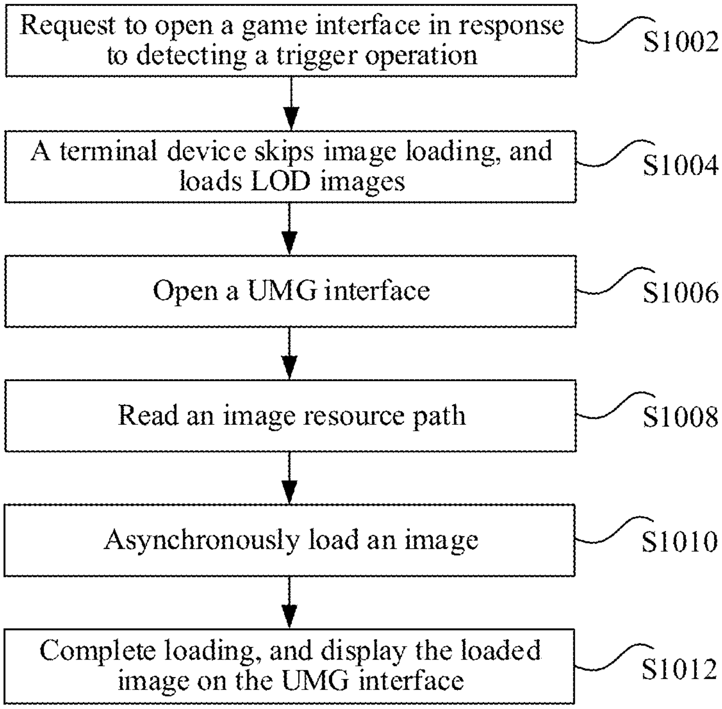
FIG. 10 is a schematic flowchart of still optional interface processing method according to an embodiment of this disclosure.

With reference to FIG. 10, the procedure of the interface processing method in this example may include the following steps:

S1002: Request to open a game interface in response to detecting a trigger operation.

S1004: Apart from a series of other operations, a terminal device skips image loading, and loads LOD images.

S1006: Open a UMG interface (that is, the game interface).

S1008: Read an image resource path.

S1010: Asynchronously load an image.

S1012: Complete loading, and display the loaded image in the UMG interface.

The steps related to image loading in the procedure of opening an interface are described below with reference to FIG. 11. The procedure of the interface processing method in this example may include the following steps:

S1102: Open a game interface.

S1104: Load various other resources (for example, a text resource) than image resources.

S1106: Load the image resources.

S1108: Determine whether the image resources need to be asynchronously loaded, and if not, perform S1110, or if yes, perform S1114.

S1110: Load the image resources in a synchronous loading manner.

S1112: Open the game interface successfully. The game interface here is opened successfully after all the resources that need to be synchronously loaded have been loaded.

S1114: Determine whether a soft reference resource (that is, a soft reference image resource) already exists in internal memory, and if yes, directly display the soft reference resource in the game interface, where S1114 is performed before S1112, or if not, S1116 and S1120 are performed.

S1116: Asynchronously load the image resources, where S1116 here may be performed after S1112, or may be performed before S1114.

S1118: After the image resources have been loaded, display the loaded image resources in the game interface.

S1120: Determine whether LOD images exist, and if yes, perform S1122, or otherwise, skip performing other steps.

S1122: Synchronously load the LOD images, where S1122 here is performed before S1112. After the LOD images have been loaded, if corresponding image resources have not been loaded at this point, the LOD images may be displayed in the display areas corresponding to the image resources in the game interface. If corresponding image resources have been loaded, the LOD images may not be displayed in the game interface.

Test data shown in Table 1 may be obtained by testing the foregoing image loading scheme.

TABLE 1

| Test scheme | Test data | Test result |
|---|---|---|
| Scheme 1 | Time consumed to load four large images Large images with no reference, and strong reference | 46.88 ms |
| Scheme 2 | Time consumed to load four large images Large images with no reference, and soft reference | 5.88 ms |
| Scheme 1 | Time consumed to load four small images Small images with no reference, and soft reference | 8.12 ms |
| Scheme 2 | Time consumed to load four small images Small images with no reference, and soft reference | 4.00 ms |
| Scheme 1 | Time consumed to load 16 small images Small images with no reference, and strong reference | 18.50 ms |
| Scheme 2 | Time consumed to load 16 small images Small images with no reference, and soft reference | 63.50 ms |

Scheme 1 is a scheme of synchronously loading all image resources in the related art, and Scheme 2 is an image loading scheme in this example. The large images have a size of 2048×1024, and the small images have a size of 128×128. "No reference" indicates that no loaded image resource exists in the internal memory.

As can be learned through the foregoing test data, the use of the image loading scheme in this example has the following conclusion: For large images, the use of asynchronous loading significantly improves performance.

As can be learned, for the time consumption of loading a UI interface, the asynchronous loading of images improves performance. On this basis, to further improve the loading performance of small images, embodiments of this disclosure provide an improved scheme for the foregoing image loading. The steps of the improved scheme of image loading are described below with reference to FIG. 12.

Figure 11:
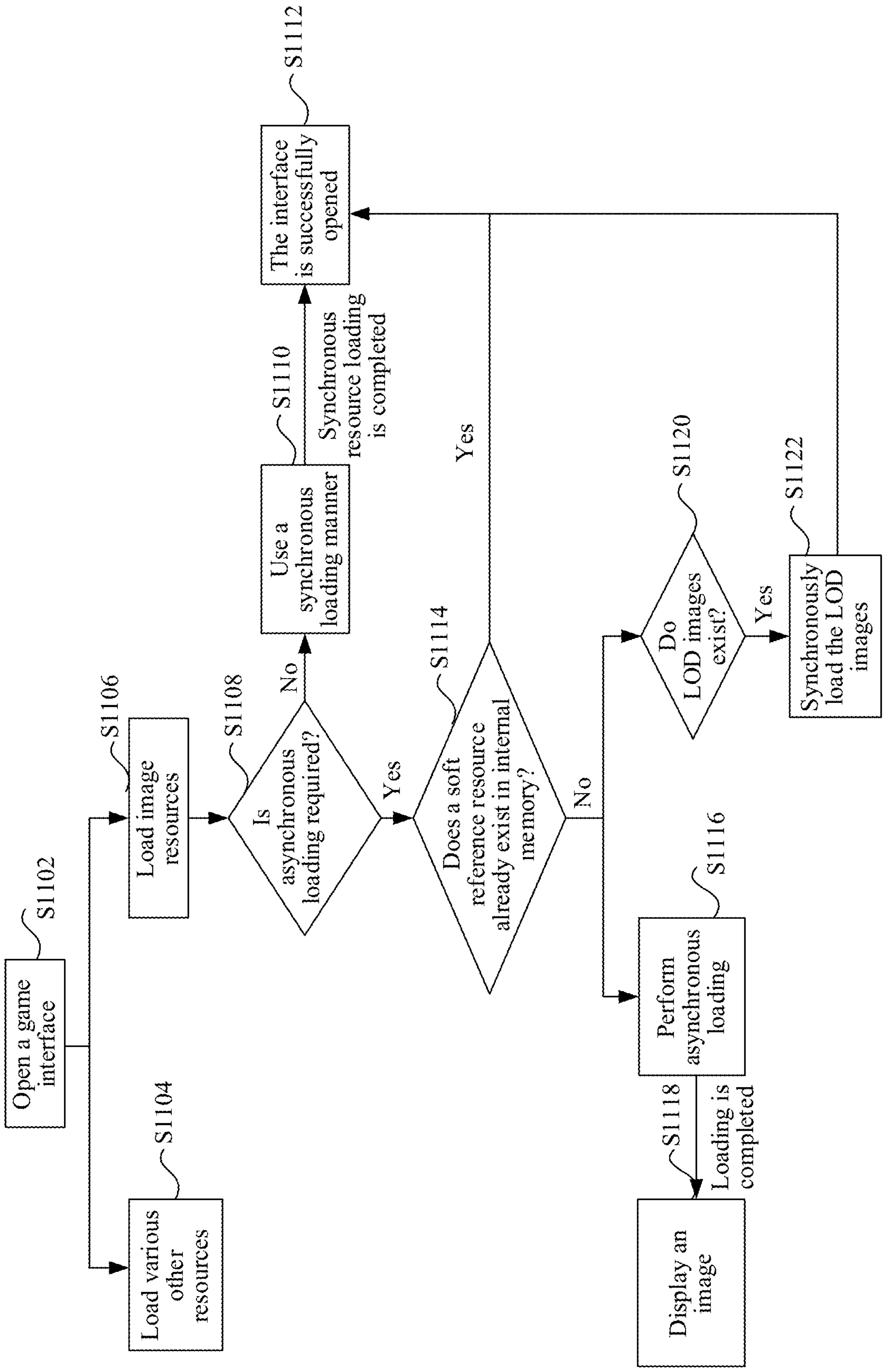
FIG. 11 is a schematic flowchart of still optional interface processing method according to an embodiment of this disclosure.
Figure 12:
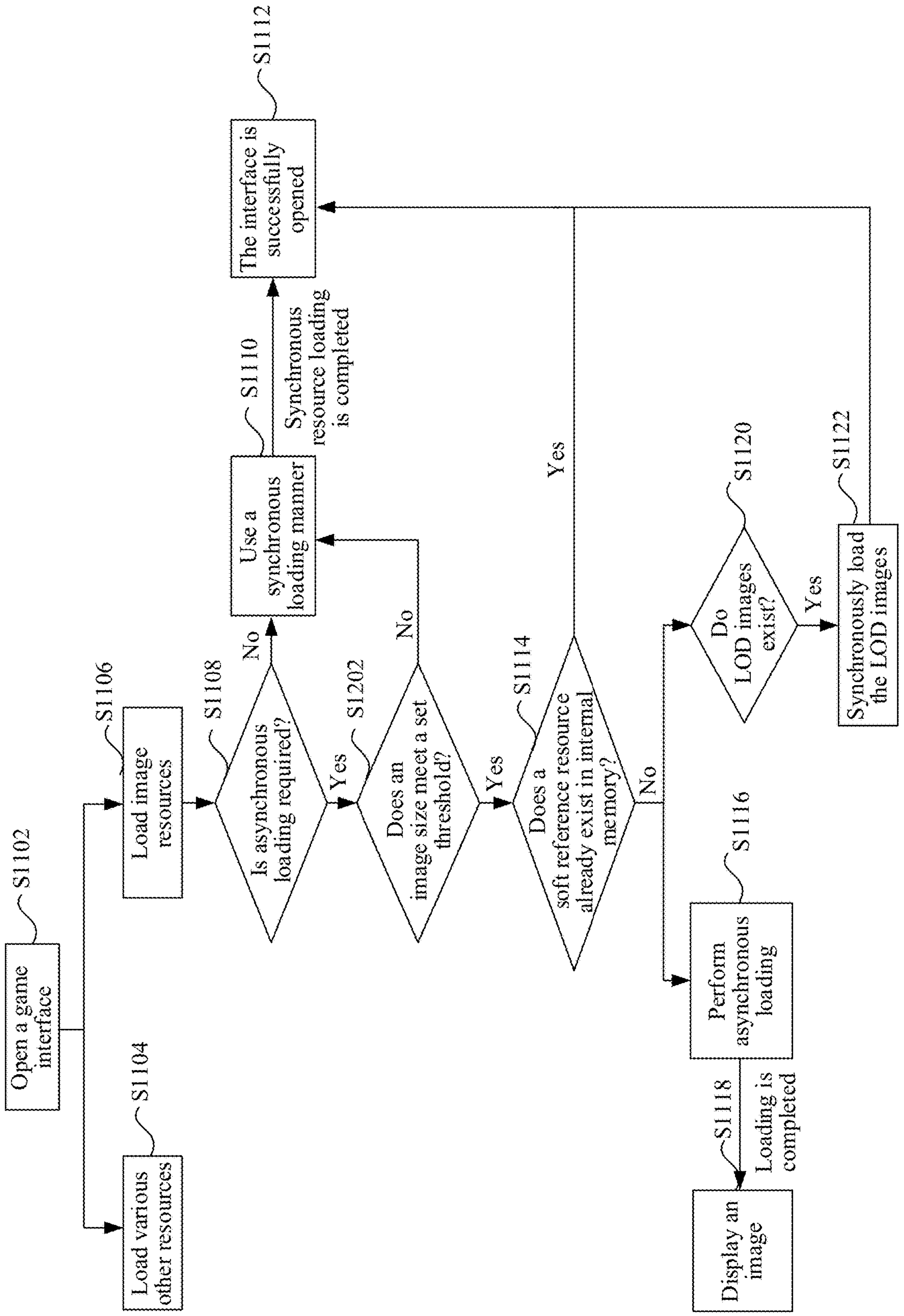
FIG. 12 is a schematic flowchart of still optional interface processing method according to an embodiment of this disclosure.

As can be learned from FIG. 11 and FIG. 12, compared with the image loading scheme in FIG. 11, the following steps are added to the improved scheme:

- S1202: Determine whether an image size meets a set threshold (that is, whether the image size is greater than the set threshold), and if yes, perform S1114, or otherwise, perform S1110.

The detection of a size of an asynchronous image is added here. If the image size is excessively small, asynchronous loading does not need to be performed. Instead, image loading is performed in a synchronous loading manner, thereby shortening the time consumption of loading a UI interface.

Figure 13:
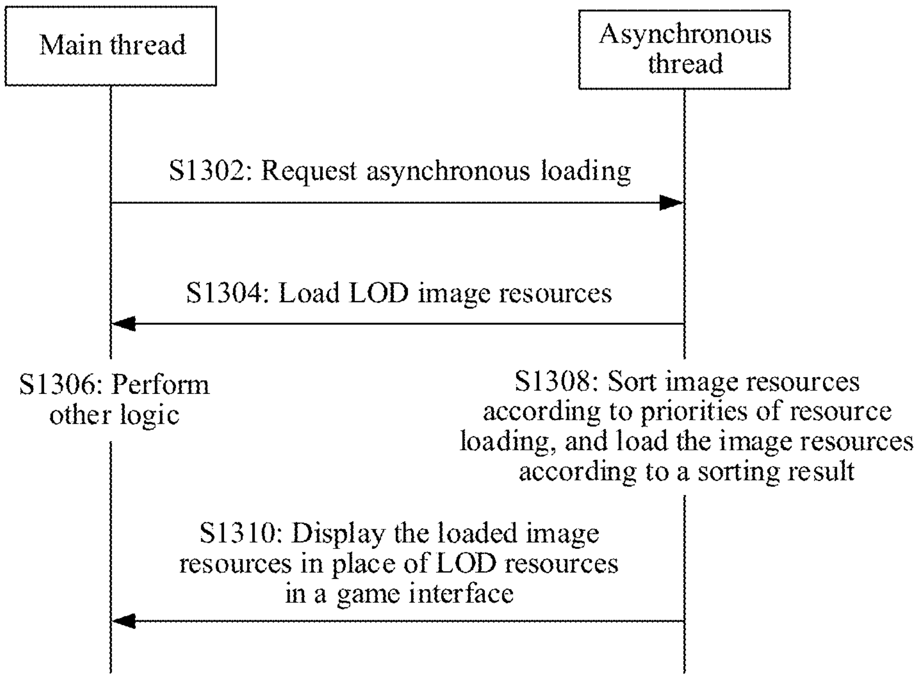
FIG. 13 is a schematic diagram of an processing procedure of asynchronously loading an image resource according to an embodiment of this disclosure.

In this example, the asynchronous loading of image resources may be performed through an asynchronous thread. Referring to FIG. 13, a processing procedure of asynchronous loading of image resources may include the following steps:

- S1302: A main thread requests asynchronous loading from an asynchronous thread.
- S1304: The asynchronous thread triggers the main thread to load (synchronously load) LOD image resources.
- S1306: The main thread performs other logic.
- S1308: The asynchronous thread sorts image resources according to priorities of resource loading of the image resources in resources, and loads the image resources according to a sorting result.
- S1310: After the image resources have been loaded, display the loaded image resources in place of LOD resources in a game interface.

The main thread is a main thread of image resource loading, and main threads corresponding to different image resources may be the same or may be different. The asynchronous thread is an asynchronous thread of image resource loading, and asynchronous threads corresponding to different image resources may be the same or may be different. The main thread and the asynchronous thread may be performed simultaneously.

Through this example, all or some image resources are asynchronously loaded, so that the time consumption of interface loading can be reduced. Through an LOD image loading scheme, a problem that a blank exists in the game interface during asynchronous loading of image resources can be avoided, so that when it is requested to open an interface, on the premise of skipping image loading, the restoration of the game interface can be ensured, and the performance of image loading (for example, loading of large images) can be significantly improved.

In an example solution, before the acquiring an interface display instruction, the foregoing method further includes the following steps:

- S121: In a process of constructing a resource package corresponding to the to-be-processed interface, initiate a serialization operation on each media resource in a to-be-processed interface container, where the to-be-processed interface container is an interface container corresponding to the to-be-processed interface.
- S122: Perform an unbinding operation on a target media resource bound to the to-be-processed interface container, where a resource type of the target media resource is the preset resource type, and the unbinding operation is configured for releasing an association relationship between displaying the to-be-processed interface and the target media resource having been loaded.
- S123: Perform a serialization operation on the target media resource after the unbinding operation is performed.

To asynchronously load the first group of media resources, a programmer (a writer of program code) or another related person may asynchronously load different images respectively in code logic. However, a related person uses written code to control whether media resources require asynchronous loading. This consumes a lot of time and labor and is prone to an error, and a related person further needs to expend considerable effort to write repetitive code, causing a waste of labor resources.

In addition, for a reconstruction person (for example, a reconstruction person of UMG) of an interface, it is relatively difficult to change an original interface construction manner of the reconstruction person, and there are also learning costs. Therefore, changing the interface construction manner of the reconstruction person does not have universality and compatibility.

In this embodiment, the entire procedure may be completed in a configuration manner, and the change from strong reference to soft reference of media resources (for example, image resources) of the to-be-processed interface (for example, the UMG interface) is implemented without changing an interface reconstruction procedure, so that while the convenience of writing code by a programmer and the convenience of constructing an interface by the reconstruction person are ensured, the performance of the constructed interface can be improved.

For the to-be-processed interface (for example, the UMG interface), the life cycle of the interface may include several following phases: initialization; construction preparation; construction start; and deletion and destruction. In this embodiment, it may be selected to asynchronously load a resource path of media resources previously saved in soft reference in an initialization phase of the life cycle, so that an application manner (or, a loading manner) of media resources can be changed without changing an interface configuration process.

In the construction of the resource package of the to-be-processed interface, the resource package corresponding to the to-be-processed interface may be acquired. The resource package here may be an installation package or an update package of an application to which the to-be-processed interface belongs, and may be a mobile installation package (for example, a mobile phone installation package, for example, a game installation package on a mobile phone), a PC installation package, or the like. In a process of constructing the resource package corresponding to the to-be-processed interface, there is a process of performing a serialization operation on each media resource in a to-be-processed interface container corresponding to the to-be-processed interface. The to-be-processed interface container here may include a plurality of components (media resource components). Each component is configured for being bound to one or more media resources. The to-be-processed interface container may be an interface blueprint, for example, a UMG blueprint.

In the process of performing the foregoing serialization, the unbinding operation may be performed on the target media resource bound to the to-be-processed interface container. A device that performs a construction procedure of the resource package may be the foregoing terminal device, or may be another device. The resource type of the target media resource here is the preset resource type (for example, an image resource). The unbinding operation releases a binding relationship between the to-be-processed interface and the target media resource, that is, the association relationship between displaying the to-be-processed interface and the target media resource having been loaded. After the unbinding operation is performed, the serialization operation may be performed on the target media resource after unbinding. The target media resource may be bound to the to-be-processed component in the to-be-processed interface container, and the target media resource and the to-be-processed interface container are bound by the to-be-processed component. Correspondingly, the unbinding operation releases a binding relationship between the to-be-processed component and the target media resource.

If the to-be-processed interface and the target media resource have a binding relationship, the target media resource needs to be loaded before the to-be-processed interface is displayed. In this case, the to-be-processed interface has strong reference with the target media resource, and the target media resource is synchronously loaded. If the to-be-processed interface and the target media resource do not have a binding relationship, the target media resource does not need to be loaded before the to-be-processed interface is displayed. In this case, the to-be-processed interface has soft reference with the target media resource, and the target media resource is asynchronously loaded. The foregoing reference relationship may be a reference relationship between the to-be-processed component and the target media resource.

The serialization indicates a process of converting an object into a byte stream, to store the object or transmit the object to the internal memory, a database, a file, or the like. A main purpose of the serialization is to save a status of an object, so that the object can be created again if necessary. A reverse process of serialization is deserialization. In other words, processes of saving and reading an object are respectively serialization and deserialization.

For example, a construction process of the mobile phone installation package includes a serialization process of a blueprint resource of UMG, so that during the serialization of an image resource bound to an image component, binding with the image resource may be released first, to perform a serialization operation on an image resource after the binding is released.

In a possible implementation, when the to-be-processed interface is displayed, for an asynchronously loaded media resource, it may be determined, according to whether a resource size of the media resource reaches the preset threshold, whether to asynchronously load the media resource. If the preset threshold is reached, asynchronous loading is performed, or otherwise, a synchronous loading manner is still used. The media resource of the preset resource type is unbound, and when the interface is displayed, it may be determined, according to whether the resource size reaches the preset threshold, whether to asynchronously load the resource, so that a media resource that is of the preset resource type and has a resource size reaching the preset threshold can be asynchronously loaded.

Through the embodiments provided in this disclosure, the unbinding operation is performed on the media resource of the preset resource type is performed in the serialization process, to release an association relationship between displaying the to-be-processed interface and the media resource (for example, the target media resource) of the preset resource type having been loaded, so that the compatibility with an existing media resource loading scheme can be improved, and in addition, the convenience and accuracy of asynchronously loading and configuring media resources can be further improved.

In an example solution, the target media resource may be bound to the to-be-processed component in the to-be-processed interface container. A binding manner may be binding and configuration through a resource path. For example, the media resource bound to the to-be-processed component is selected as the target media resource. In addition, a replacement media resource bound to the to-be-processed component may further be selected, that is, displayed in place of the target media resource at a display position corresponding to the target media resource in the to-be-processed interface. Correspondingly, the performing an unbinding operation on the target media resource bound to the to-be-processed interface container includes the following steps:

S131: Assign an asynchronous loading variable of a resource path of the target media resource to the to-be-processed component, where the asynchronous loading variable is configured for indicating to asynchronously load the target media resource when the to-be-processed interface is displayed.

S132: Clear a synchronous loading variable of the to-be-processed component, to release the association relationship between displaying the to-be-processed interface and the target media resource having been loaded, where the synchronous loading variable is configured for indicating to synchronously load the target media resource when the to-be-processed interface is displayed.

In this embodiment, the resource path of the target media resource may be assigned to the asynchronous loading variable of the to-be-processed component (that is, a soft reference variable), and the synchronous loading variable of the to-be-processed component is cleared. If there are a plurality of synchronous loading variables, a synchronous loading variable corresponding to the target media resource in the plurality of synchronous loading variables of the to-be-processed component is cleared, to implement the unbinding of the target media resource and to-be-processed component.

When the unbinding operation is performed on the target media resource, the resource path of the target media resource may be first assigned to the asynchronous loading variable of the to-be-processed component. The asynchronous loading variable may be preconfigured, or may be generated in a serialization process, and may be configured for indicating to asynchronously load the target media resource when the to-be-processed interface is displayed. Because the target media resource is asynchronously loaded, whether the target media resource has been loaded does not affect the displaying of the to-be-processed interface, thereby releasing the association relationship between displaying the to-be-processed interface and the target media resource having been loaded.

In addition, because the target media resource is bound to the to-be-processed component, the to-be-processed component has a synchronous loading variable (strong reference variable) corresponding to the target media resource, and may be configured for indicating to synchronously load the target media resource when the to-be-processed interface is displayed. Because the target media resource is synchronously loaded when the to-be-processed interface is displayed, the target media resource needs to be loaded before the to-be-processed interface can be displayed. Therefore, the displaying the to-be-processed interface and the target media resource having been loaded have an association relationship. If the synchronous loading variable is kept, a loading error of the target media resource is caused, or, the target media resource is still synchronously loaded. For this, the synchronous loading variable of the to-be-processed component may be cleared, to release the association relationship between displaying the to-be-processed interface and the target media resource having been loaded.

The strong reference variable and the soft reference variable may both point to the resource path of the target media resource through pointers, and only variable types or pointer types of the two are different, so that it may be determined, based on a variable type or a pointer type, whether the target media resource needs to be synchronously loaded or asynchronously loaded.

Through the embodiments provided in this disclosure, a resource path of a media resource is assigned to an asynchronous loading variable bound to a component, and the corresponding synchronous loading variable is deleted, so that the efficiency of unbinding a media resource can be improved.

In an example solution, the foregoing method further includes the following steps:

S141: Perform, in a case that it is determined that the target media resource has a corresponding replacement media resource, a serialization operation on the replacement media resource, where the replacement media resource is configured for being displayed in place of the target media resource in a display area corresponding to the target media resource in the to-be-processed interface.

In this embodiment, a replacement media resource corresponding to the target media resource may be configured for the target media resource, is configured for being displayed in place of the target media resource in the display area corresponding to the target media resource in the to-be-processed interface, and is, for example, the foregoing LOD image. For example, the LOD image may be bound to the to-be-processed component in the to-be-processed interface container as the replacement media resource of the image resource bound to the to-be-processed component. The replacement media resource may be a media resource that needs to be synchronously loaded, and has a strong reference relationship with the to-be-processed interface container or the to-be-processed component. If the target media resource has a corresponding replacement media resource, a serialization operation may be performed on the replacement media resource. For a process of performing a serialization operation on a media resource, refer to the related art. Details are not described herein in this embodiment.

Through the embodiments provided in this disclosure, a serialization operation is performed on a replacement media resource corresponding to an asynchronously loaded media resource (for example, a target media resource), so that the convenience of processing the replacement media resource can be improved (the asynchronously loaded media resource and the corresponding replacement media resource are both serialized in a serialization process).

The interface processing method in the embodiments of this disclosure is described below with reference to an example. In this example, the to-be-processed interface is a game interface, the asynchronously loaded media resources are image resources, the replacement media resources are LOD images, and the resource package is an installation package of a mobile phone game, that is, a mobile phone installation package.

This example provides a UE4-based scheme for improving the loading speed of a game interface. During serialization, an image resource bound to UMG may be unbound, and then an image resource path after unbinding is saved in soft reference (which may be understood as a resource path for saving an image), to implement an attribute change between the image from strong reference to soft reference.

Figure 14:
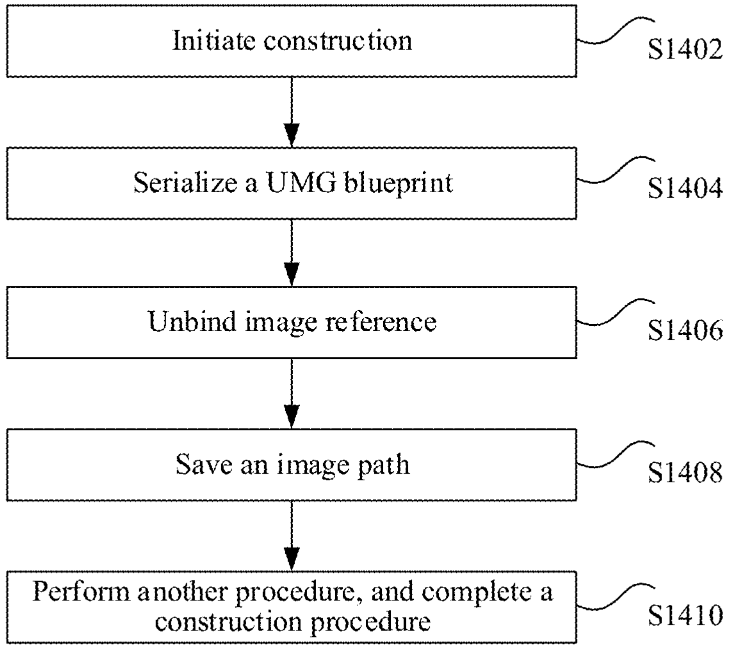
FIG. 14 is a schematic diagram of an construction procedure of a mobile phone installation package according to an embodiment of this disclosure.

The serialization here is one step in the construction process of the mobile phone installation package. As shown in FIG. 14, the construction process of the mobile phone installation package may include the following steps:

S1402: Initiate construction, that is, start to construct the mobile phone installation package.

S1404: Apart from a series of other procedures that need to be performed, serialize a UMG blueprint, and during the serialization, perform a serialization operation on each component in the UMG blueprint.

S1406 to 1408: Unbind image reference, and save an image path.

S1410: Perform another procedure, and complete a construction procedure.

Figure 15:
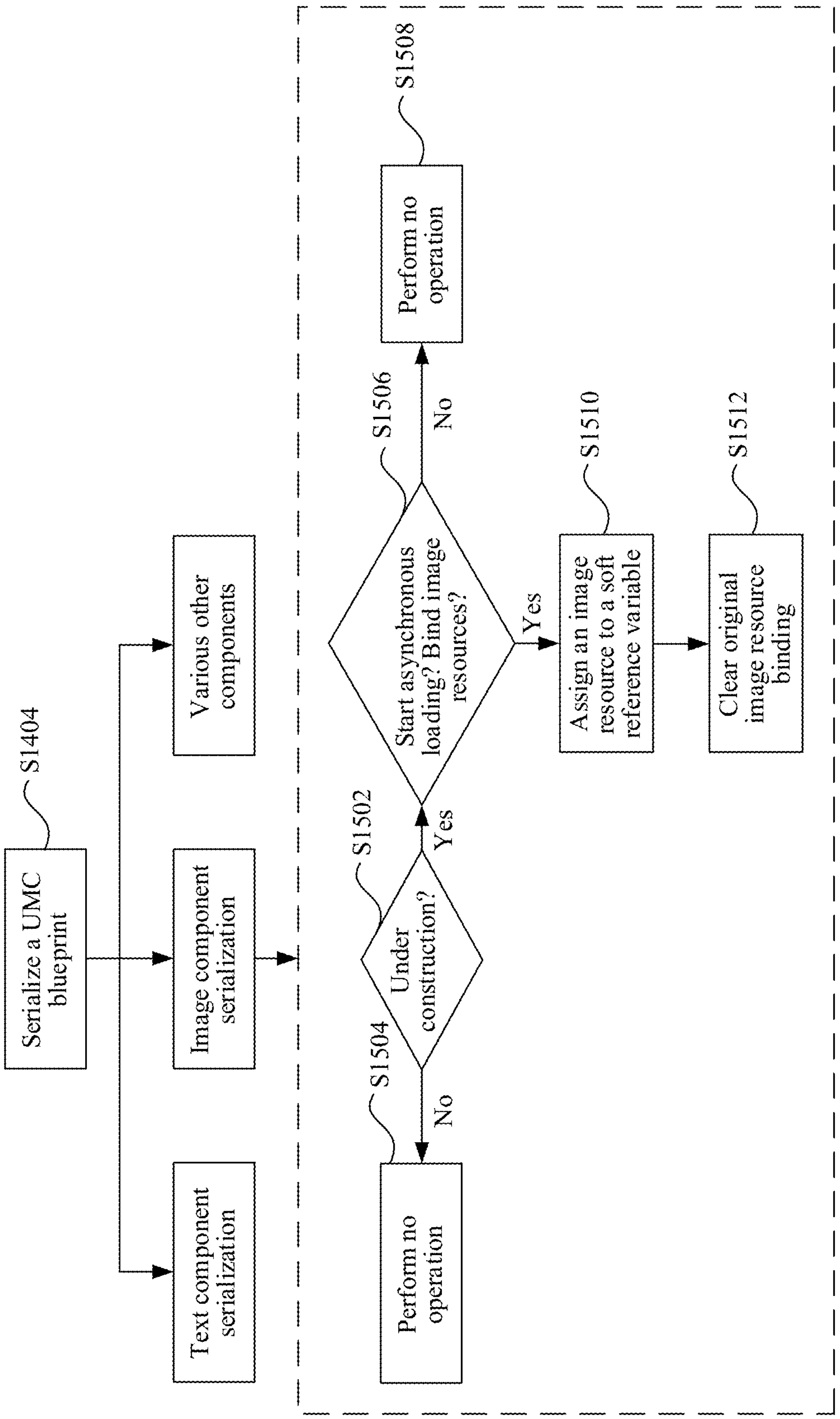
FIG. 15 is a schematic diagram of an procedure of image unbinding according to an embodiment of this disclosure.

The unbinding of image reference is changing original strong reference of an image resource to soft reference. As shown in FIG. 15, a procedure of image unbinding may include the following steps:

S1502: Determine whether construction is being performed, and if not, perform S1504, or if yes, perform S1506.

In a process of serializing the UMG blueprint, a text component may be serialized, an image component may be serialized, and various other components may be serialized. During the serialization of the image component, it may be first determined whether the mobile phone installation package is being constructed, and if not, S1504 is performed, or if yes, S1506 is performed.

S1504: Perform no operation if it is not a construction phase.

S1506: Determine whether asynchronous loading is started and whether an image resource is bound, and if asynchronous loading is not started or an image resource is not bound, perform S1508, or if asynchronous loading is started and an image resource is bound, perform S1510.

S1508: If asynchronous loading is started, regardless of whether an image resource is bound, perform no operation; and if no image resource is bound, regardless of whether asynchronous loading is started, perform no operation.

S1510: Assign an image resource to a soft reference variable (that is, an asynchronous loading variable).

S1512: Clear original image resource binding.

After the entire procedure is completed, an image resource bound to an image component may be successfully unloaded, and image information is saved in another form, that is, saved in a soft reference form.

S1410: Perform another procedure, and complete a construction procedure of the mobile phone installation package.

Through this example, a universal scheme for improving the loading speed of a UMG interface is provided, an existing interface reconstruction procedure is not affected, and no additional learning costs are required. In addition, this scheme may be extended to other game engines than UE4, and is applicable to different game engines. Only implementation forms of different game engines are different.

For each of the foregoing method embodiments, for ease of description, the method embodiment is described as a series of action combinations, but a person skilled in the art is to learn that this disclosure is not limited to an order of described actions because according to this disclosure, some steps may be performed in another order or at the same time. In addition, a person skilled in the art is also to know that the related actions and modules are not necessarily required in this disclosure.

Figure 16:
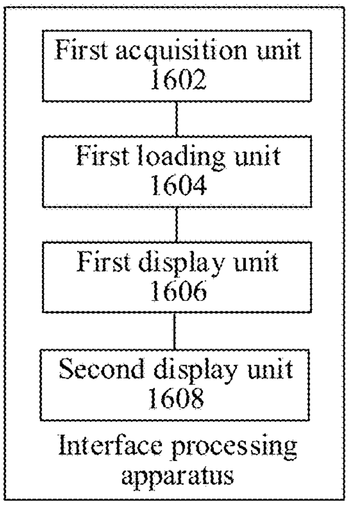
FIG. 16 is a structural block diagram of an interface processing apparatus according to an embodiment of this disclosure.

According to another aspect of an embodiment of this disclosure, an interface processing apparatus configured for implementing the foregoing interface processing method is further provided. FIG. 16 is a schematic structural diagram of an interface processing apparatus according to an embodiment of this disclosure. As shown in FIG. 16, the foregoing apparatus may include:

a first acquisition unit 1602, configured to acquire an interface display instruction, the interface display instruction being configured for requesting to display a to-be-processed interface;

a first loading unit 1604, configured to load, in a case that it is determined that a first group of media resources exist in a to-be-loaded media resource set in the target interface, a second group of media resources other than the first group of media resources in the media resource set in response to the interface display instruction, a resource size of each media resource of the first group of media resources being greater than a preset threshold;

a first display unit 1606, configured to display the to-be-processed interface including the second group of media resources in a case that it is determined that the second group of media resources have been loaded and none of the first group of media resources has been loaded; and a second display unit 1608, configured to display the first group of media resources in the to-be-processed interface in a case that the to-be-processed interface including the second group of media resources is displayed and in a case that it is determined that the first group of media resources have been loaded.

The first acquisition unit 1602 in the embodiments may be configured for performing the foregoing S202, the first loading unit 1604 in the embodiments may be configured for performing the foregoing S204, the first display unit 1606 in the embodiments may be configured for performing the foregoing S206, and the second display unit 1608 may be configured for performing the foregoing S208.

Through the embodiments provided in this disclosure, an interface display instruction is acquired, the interface display instruction being configured for requesting to display a to-be-processed interface. In a case that it is determined that a first group of media resources exist in a to-be-loaded media resource set in the to-be-processed interface, a second group of media resources other than the first group of media resources in the media resource set are loaded in response to the interface display instruction, a resource size of each media resource of the first group of media resources being greater than a preset threshold. The to-be-processed interface including the second group of media resources is displayed in a case that it is determined that the second group of media resources have been loaded and none of the first group of media resources has been loaded. The first group of media resources in the to-be-processed interface are displayed in a case that the to-be-processed interface including the second group of media resources is displayed and in a case that it is determined that the first group of media resources have been loaded. A problem that it is necessary to load an excessively large quantity of resources to open an interface and as a result it takes an excessively long time to open the interface in the related art is resolved, thereby shortening a time required to display the interface, and improving the completeness of information display.

In an example solution, the foregoing apparatus further includes:

a second loading unit, configured to load the first group of media resources, where the first group of media resources are loaded in response to the interface display instruction, or, loaded after the to-be-processed interface is displayed.

For the example of this implementation solution, refer to the example shown in the foregoing interface processing method. Details are not described herein again in this implementation solution.

In an example solution, the foregoing apparatus further includes a third loading unit, and the first display unit includes a first display module, where the third loading unit is configured to load, in a case that it is determined that a first media resource in the first group of media resources has a first replacement resource, the first replacement resource in response to the interface display instruction, where the first replacement resource is configured for being displayed in place of the first media resource in a first display area, and the first display area is a display area corresponding to the first media resource in the to-be-processed interface; and the first display module is configured to display the to-be-processed interface including the second group of media resources and the first replacement resource in a case that it is determined that the second group of media resources and the first replacement resource have been loaded and none of the first group of media resources has been loaded.

For the example of this implementation solution, refer to the example shown in the foregoing interface processing method. Details are not described herein again in this implementation solution.

In an example solution, the second display unit includes:

a first replacement module, configured to display the first media resource in the first group of media resources in place of the first replacement resource in the first display area in a case that the to-be-processed interface including the second group of media resources and the first replacement resource is displayed and in a case that it is determined that the first group of media resources have been loaded.

For the example of this implementation solution, refer to the example shown in the foregoing interface processing method. Details are not described herein again in this implementation solution.

In an example solution, the foregoing apparatus further includes:

a third display unit, configured to: after the second group of media resources other than the first group of media resources in the media resource set are loaded in response to the interface display instruction, display, in a case that it is determined that the second group of media resources have been loaded and a third group of media resources in the first group of media resources have been loaded, the to-be-processed interface including the second group of media resources and the third group of media resources.

a fourth display unit, configured to display, in a case that the to-be-processed interface including the second group of media resources and the third group of media resources is displayed and in a case that it is determined that a fourth group of media resources other than the third group of media resources in the first group of media resources have been loaded, the fourth group of media resources in the to-be-processed interface.

For the example of this implementation solution, refer to the example shown in the foregoing interface processing method. Details are not described herein again in this implementation solution.

In an example solution, the foregoing apparatus further includes:

a search unit, configured to: search internal memory for the first group of media resources in response to the interface display instruction; and determine historical media resources that are found from the internal memory and belong to the first group of media resources as the third group of media resources.

For the example of this implementation solution, refer to the example shown in the foregoing interface processing method. Details are not described herein again in this implementation solution.

In an example solution, the foregoing apparatus further includes:

a fourth loading unit, configured to: after the interface display instruction is acquired, load other media resources than the historical media resources in the first group of media resources in response to the interface display instruction, where the third group of media resources further include media resources that have been loaded in the other media resources when the second group of media resources have been loaded.

For the example of this implementation solution, refer to the example shown in the foregoing interface processing method. Details are not described herein again in this implementation solution.

In an example solution, the foregoing apparatus further includes a fifth loading unit, and the third display unit includes a second display module, where the fifth loading unit is configured to: after the interface display instruction is acquired, load, in a case that it is determined that a second media resource in the first group of media resources has a second replacement resource, the second replacement resource in response to the interface display instruction, where the second replacement resource is configured for being displayed in place of the second media resource in a second display area, the second media resource is a media resource other than the historical media resources in the first group of media resources, and the second display area is a display area corresponding to the second media resource in the to-be-processed interface; and the second display module is configured to display the to-be-processed interface including the second group of media resources, the third group of media resources, and the second replacement resource in a case that it is determined that the second group of media resources, the second replacement resource, and the third group of media resources have been loaded and the third group of media resources do not include the second media resource.

For the example of this implementation solution, refer to the example shown in the foregoing interface processing method. Details are not described herein again in this implementation solution.

In an example solution, the fourth display unit includes:

a second replacement module, configured to display the second media resource in place of the second replacement resource in the second display area in a case that the to-be-processed interface including the second group of media resources, the third group of media resources, and the second replacement resource is displayed and in a case that it is determined that the second media resource has been loaded, where the fourth group of media resources include the second media resource.

For the example of this implementation solution, refer to the example shown in the foregoing interface processing method. Details are not described herein again in this implementation solution.

In an example solution, the foregoing apparatus further includes:

a fifth display unit, configured to: after the second group of media resources other than the first group of media resources in the media resource set are loaded in response to the interface display instruction, display the to-be-processed interface including the second group of media resources and the first group of media resources in a case that it is determined that the second group of media resources have been loaded and all the first group of media resources have been loaded.

For the example of this implementation solution, refer to the example shown in the foregoing interface processing method. Details are not described herein again in this implementation solution.

In an example solution, the foregoing apparatus further includes:

a second acquisition unit, configured to: after the interface display instruction is acquired, acquire resource description information corresponding to the to-be-processed interface in response to the interface display instruction, where the resource description information is configured for describing a resource attribute of a media resource included in the to-be-processed interface, and the resource attribute includes a resource size; and a first determining unit, configured to determine the media resource set, the first group of media resources, and the second group of media resources according to the resource description information.

For the example of this implementation solution, refer to the example shown in the foregoing interface processing method. Details are not described herein again in this implementation solution.

In an example solution, the foregoing apparatus further includes:

a second determining unit, configured to: after the interface display instruction is acquired, determine media resources whose resource type is a preset resource type and whose resource size is greater than the preset threshold in the media resource set as the first group of media resources.

For the example of this implementation solution, refer to the example shown in the foregoing interface processing method. Details are not described herein again in this implementation solution.

In an example solution, the foregoing apparatus further includes:

an initiation unit, configured to: before the interface display instruction is acquired, in a process of constructing a resource package corresponding to the to-be-processed interface, initiate a serialization operation on each media resource in a to-be-processed interface container, where the to-be-processed interface container is an interface container corresponding to the to-be-processed interface;

a first execution unit, configured to perform an unbinding operation on a target media resource bound to the to-be-processed interface container, where a resource type of the target media resource is the preset resource type, and the unbinding operation is configured for releasing an association relationship between displaying the to-be-processed interface and the target media resource having been loaded; and a second execution unit, configured to perform a serialization operation on the target media resource after the unbinding operation is performed.

For the example of this implementation solution, refer to the example shown in the foregoing interface processing method. Details are not described herein again in this implementation solution.

In an example solution, the target media resource is bound to a to-be-processed component in the to-be-processed interface container; and the first execution unit includes:

an assignment module, configured to assign an asynchronous loading variable of a resource path of the target media resource to the to-be-processed component, where the asynchronous loading variable is configured for indicating to asynchronously load the target media resource when the to-be-processed interface is displayed; and a clear module, configured to clear a synchronous loading variable of the to-be-processed component, to release the association relationship between displaying the to-be-processed interface and the target media resource having been loaded, where the synchronous loading variable is configured for indicating to synchronously load the target media resource when the to-be-processed interface is displayed.

For the example of this implementation solution, refer to the example shown in the foregoing interface processing method. Details are not described herein again in this implementation solution.

In an example solution, the foregoing apparatus further includes:

a third execution unit, configured to perform, in a case that it is determined that the target media resource has a corresponding replacement media resource, a serialization operation on the replacement media resource, where the replacement media resource is configured for being displayed in place of the target media resource in a display area corresponding to the target media resource in the to-be-processed interface.

For the example of this implementation solution, refer to the example shown in the foregoing interface processing method. Details are not described herein again in this implementation solution.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 17:
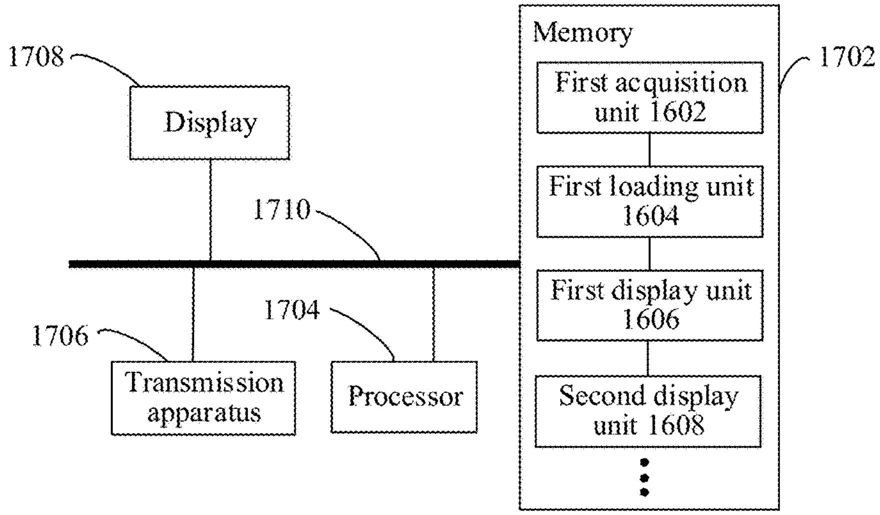
FIG. 17 is a schematic structural diagram of an electronic device according to an embodiment of this disclosure.

According to still another aspect of the embodiments of this disclosure, an electronic device configured to implement the foregoing interface processing method is further provided. The electronic device may be the terminal device or the server shown in FIG. 1. This embodiment is described by using an example in which the electronic device is a terminal device. As shown in FIG. 17, the electronic device includes a memory 1702 and a processor 1704. The memory 1702 stores a computer program. The processor 1704 is configured to perform the steps in any one of the foregoing method embodiments through the computer program.

In a possible implementation, in this embodiment, the foregoing electronic device may be at least one network device of a plurality of network devices located in computer network.

In a possible implementation, in this embodiment, the foregoing processor may be configured to perform the following steps through the computer program:

S1: Acquire an interface display instruction, the interface display instruction being configured for requesting to display a to-be-processed interface.

S2: Load, in a case that it is determined that a first group of media resources exist in a to-be-loaded media resource set in the target interface, a second group of media resources other than the first group of media resources in the media resource set in response to the interface display instruction, a resource size of each media resource of the first group of media resources being greater than a preset threshold.

S3: Display the to-be-processed interface including the second group of media resources in a case that it is determined that the second group of media resources have been loaded and none of the first group of media resources has been loaded.

S4: Display the first group of media resources in the to-be-processed interface in a case that the to-be-processed interface including the second group of media resources is displayed and in a case that it is determined that the first group of media resources have been loaded.

In a possible implementation, a person of ordinary skill in the art may understand that the structure shown in FIG. 17 is only an example. The electronic device may be alternatively a smartphone (for example, an Android phone, an iOS phone, or the like), a tablet computer, a palmtop computer, a MID, a PAD, or another terminal device. FIG. 17 does not constitute a limitation to the structure of the foregoing electronic device. For example, the electronic device may further include more or fewer components (for example, a network interface, or the like) shown in FIG. 17, or have a configuration different from that in FIG. 17.

The memory 1702 may be configured to store software programs and modules, for example, program instructions/modules corresponding to the interface processing method and apparatus in the embodiments of this disclosure. The processor 1704 runs the software programs and modules stored in the memory 1702, to perform various functional applications and data processing, to be specific, implement the foregoing interface processing method. The memory 1702 may include a non-transitory memory, such as a high-speed random memory, and a non-volatile memory such as one or more magnetic storage apparatuses, a flash, or another non-volatile solid-state memory. In some examples, the memory 1702 may further include memories remotely disposed relative to the processor 1704, and these remote memories may be connected to a terminal through a network. Instances of the network include, but are not limited to, the Internet, an intranet, a local area network, a mobile communication network, and a combination thereof. The memory 1702 may be specifically used for, but not limited to, a serialization file, a compilation file, and other information. In an example, as shown in FIG. 17, the foregoing memory 1702 may include, but not limited to, the first acquisition unit 1602, the first loading unit 1604, the first display unit 1606, and the second display unit 1608 in the foregoing interface processing apparatus, and in addition, may further include, but not limited to, other modular units in the foregoing interface processing apparatus. Details are not described again in this example.

In a possible implementation, the foregoing transmission apparatus 1706 is configured to receive or transmit data through a network. Specific instances of the foregoing network may include a wired network and a wireless network. In an example, the transmission apparatus 1706 includes a network interface controller (NIC). The NIC may be connected to another network device and a router by using a network cable, to communicate with the Internet or the local network. In an example, the transmission apparatus 1706 is an RF module, which communicates with the Internet in a wireless manner.

In addition, the foregoing electronic device further includes: a display 1708, configured to display a to-be-processed interface; and a connection bus 1710, configured to connect various module components in the electronic device.

In other embodiments, the foregoing terminal device or server may be a node in a distributed system. The distributed system may be a blockchain system. The blockchain system may be formed by a plurality of nodes through network communication. A peer to peer (P2P) network may be formed between the nodes. A computing device in any form, for example, an electronic device such as a server or a terminal, may become a node in the blockchain system by joining the peer to peer network.

According to an aspect of this disclosure, a computer program product is provided. The computer program product includes a computer program. The computer program includes program code used for performing the methods shown in the flowcharts. In such an embodiment, by using the communication part 1809, the computer program may be downloaded and installed from a network, and/or installed from the removable medium 1811. When the computer program is executed by the central processing unit 1801, various functions provided in the embodiments of this disclosure are executed. The sequence numbers of the foregoing embodiments of this disclosure are merely for description purpose, and are not intended to indicate the preference among the embodiments.

Figure 18:
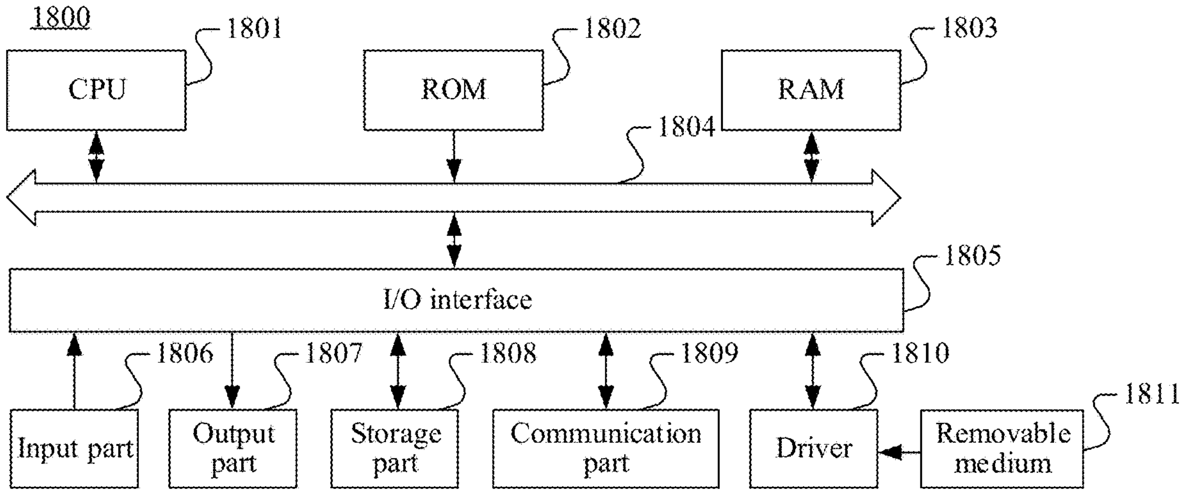
FIG. 18 is a structural block diagram of a computer system of an electronic device according to an embodiment of this disclosure.

FIG. 18 is a schematic structural block diagram of a computer system of an electronic device configured to implement the embodiments of this disclosure. As shown in FIG. 18, the computer system 1800 includes processing circuitry, such as a central processing unit (CPU) 1801, which may perform various suitable actions and processing based on a program stored in a read-only memory (ROM) 1802 or a program loaded from a storage part 1808 into a random access memory (RAM) 1803. The random access memory 1803 further stores various programs and data required for system operations. The central processing unit 1801, the read-only memory 1802, and the random access memory 1803 are connected to each other by a bus 1804. An input/output (I/O) interface 1805 is also connected to the bus 1804.

The following components are connected to the input/output interface 1805: an input part 1806 including a keyboard, a mouse, or the like; an output part 1807 including a cathode ray tube (CRT), a liquid crystal display (LCD), a speaker, or the like; a storage part 1808 including a hard disk, or the like; and a communication part 1809 including a network interface card such as a local area network card or a modem. The communication part 1809 performs communication processing by using a network such as the Internet. A drive 1810 is also connected to the input/output interface 1805 as required. A removable medium 1811, such as a magnetic disk, an optical disc, a magneto-optical disk, or a semiconductor memory, is mounted on the driver 1810 as required, so that a computer program read from the removable medium is installed into the storage part 1808 as required.

Particularly, according to the embodiments of this disclosure, the processes described in the method flowcharts may be implemented as computer software programs. For example, the embodiments of this disclosure include a computer program product, the computer program product includes a computer program carried on a computer-readable medium, and the computer program includes program code used for performing the methods shown in the flowcharts. In such an embodiment, by using the communication part 1809, the computer program may be downloaded and installed from a network, and/or installed from the removable medium 1811. When the computer program is executed by the central processing unit 1801, the various functions defined in the system of this application are executed.

A computer system 1800 of the electronic device shown in FIG. 18 is merely an example, and does not constitute any limitation on functions and use ranges of the embodiments of this disclosure.

According to an aspect of this disclosure, a computer-readable storage medium, such as a non-transitory computer-readable storage medium, is provided. A processor of a computer device reads the computer program from the computer-readable storage medium, and the processor performs the computer program, to cause the computer device to perform the method provided in various implementations in the foregoing embodiments.

In an implementation, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

When the integrated unit in the foregoing embodiments is implemented in the form of a software function unit and sold or used as an independent product, the integrated unit may be stored in the foregoing computer-readable storage medium. Based on such an understanding, aspects of this disclosure may be implemented in a form of a software product. The computer software product is stored in a storage medium and includes several instructions for instructing one or more computer devices (which may be a personal computer, a server, a network device, and the like) to perform all or some of the steps of the methods described in the embodiments of this disclosure.

In the foregoing embodiments of this disclosure, descriptions of the embodiments have different emphases. As for parts that are not described in detail in one embodiment, reference may be made to the relevant descriptions of the other embodiments.

In the several embodiments provided in this disclosure, it is to be understood that the disclosed client may be implemented in other manners. The apparatus embodiments described above are merely examples. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection through some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or at least two units may be integrated into one unit. The integrated unit may be implemented in the form of hardware, or may be implemented in the form of a software functional unit.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing descriptions are merely some examples of implementations of this disclosure. A person of ordinary skill in the art may further make several improvements and modifications without departing from the principle of this disclosure, and the improvements and modifications are also considered as falling within the protection scope of this disclosure.

What is claimed is:

1. An interface processing method, comprising:

receiving an interface display instruction to display a user interface;

loading, when a media resource set of the user interface includes a first group of media resources and a second group of media resources that is different from the first group of media resources, the second group of media resources in the media resource set based on the interface display instruction, a resource size of each media resource of the first group of media resources being greater than a threshold;

displaying the user interface with the second group of media resources when the second group of media resources are loaded and before the first group of media resources is loaded; and displaying the first group of media resources in the user interface with the second group of media resources when the first group of media resources is loaded.

2. The method according to claim 1, wherein the method further comprises:

loading the first group of media resources based on the interface display instruction.

3. The method according to claim 1, wherein the method further comprises:

loading, when a first media resource in the first group of media resources is associated with a first replacement resource, the first replacement resource based on the interface display instruction, the first replacement resource being initially displayed in a first display area of the first media resource in the user interface; and the displaying the user interface with the second group of media resources includes displaying the user interface with the second group of media resources and the first replacement resource when the second group of media resources and the first replacement resource are loaded and before the first group of media resources is loaded.

4. The method according to claim 3, wherein the displaying the first group of media resources in the user interface comprises:

displaying the first media resource in the first group of media resources in the first display area when the first group of media resources is loaded.

5. The method according to claim 1, wherein the method further comprises:

displaying, when the second group of media resources is loaded and a third group of media resources in the first group of media resources is loaded, the user interface with the second group of media resources and the third group of media resources; and displaying, when the user interface is displayed with the second group of media resources and the third group of media resources and a fourth group of media resources that is different from the third group of media resources in the first group of media resources is loaded, the fourth group of media resources in the user interface.

6. The method according to claim 5, wherein the method further comprises:

searching internal memory for the first group of media resources based on the interface display instruction; and determining previously loaded media resources that are found in the internal memory and belong to the first group of media resources as the third group of media resources.

7. The method according to claim 6, wherein the method further comprises:

loading other media resources that are different from the previously loaded media resources in the first group of media resources based on the interface display instruction, the third group of media resources including media resources that are loaded in the other media resources when the second group of media resources is loaded.

8. The method according to claim 6, wherein the method further comprises:

loading, when a second media resource in the first group of media resources is associated with a second replacement resource, the second replacement resource based on the interface display instruction, the second replacement resource being displayed in a second display area, the second media resource being different from the previously loaded media resources in the first group of media resources, and the second display area corresponding to the second media resource in the user interface; and the displaying the user interface with the second group of media resources and the third group of media resources comprises:

displaying the user interface with the second group of media resources, the third group of media resources, and the second replacement resource when the second group of media resources, the second replacement resource, and the third group of media resources is loaded and the third group of media resources does not include the second media resource.

9. The method according to claim 8, wherein the displaying the fourth group of media resources in the user interface comprises:

displaying the second media resource in the second display area when the user interface is displayed with the second group of media resources, the third group of media resources, and the second replacement resource and the second media resource is loaded, the fourth group of media resources including the second media resource.

10. The method according to claim 1, wherein the method further comprises:

displaying the user interface with the second group of media resources and the first group of media resources when the second group of media resources is loaded and the first group of media resources is loaded.

11. The method according to claim 1, wherein the method further comprises:

acquiring resource description information of the user interface based on the interface display instruction, the resource description information indicating a resource size of each of the first and second group of media resources included in the user interface; and determining the media resource set, the first group of media resources, and the second group of media resources based on the resource description information.

12. The method according to claim 1, wherein the method further comprises:

determining the media resources of a preset resource type and a resource size that is greater than the threshold in the media resource set as the first group of media resources.

13. The method according to claim 12, wherein the method further comprises:

in a process of constructing a resource package corresponding to the user interface, initiating a serialization operation on each media resource in a user interface container, the user interface container corresponding to the user interface;

performing an unbinding operation on a target media resource bound to the user interface container, a resource type of the target media resource being the preset resource type, and the unbinding operation is configured to release an association relationship between displaying the user interface and the target media resource is loaded; and performing a serialization operation on the target media resource after the unbinding operation is performed.

14. The method according to claim 13, wherein the target media resource is bound to a component in the user interface container; and the performing the unbinding operation comprises:

assigning an asynchronous loading variable of a resource path of the target media resource to the component, the asynchronous loading variable indicating the target media resource is to be asynchronously loaded when the user interface is displayed; and clearing a synchronous loading variable of the component, to release the association relationship between the displaying the user interface and the target media resource is loaded, the synchronous loading variable indicating the target media resource is to be synchronously loaded when the user interface is displayed.

15. The method according to claim 13, wherein the method further comprises:

performing, when the target media resource has a corresponding replacement media resource, a serialization operation on the replacement media resource, the replacement media resource being displayed in a display area corresponding to the target media resource in the user interface.

16. An information processing apparatus, comprising:

processing circuitry configured to:

receive an interface display instruction to display a user interface;

load, when a media resource set of the user interface includes a first group of media resources and a second group of media resources that is different from the first group of media resources, the second group of media resources in the media resource set based on the interface display instruction, a resource size of each media resource of the first group of media resources being greater than a threshold;

display the user interface with the second group of media resources when the second group of media resources are loaded and before the first group of media resources is loaded; and display the first group of media resources in the user interface with the second group of media resources when the first group of media resources is loaded.

17. The information processing apparatus according to claim 16, wherein the processing circuitry is configured to:

load the first group of media resources based on the interface display instruction.

18. The information processing apparatus according to claim 16, wherein the processing circuitry is configured to:

load, when a first media resource in the first group of media resources is associated with a first replacement resource, the first replacement resource based on the interface display instruction, the first replacement resource being initially displayed in a first display area of the first media resource in the user interface; and display the user interface with the second group of media resources and the first replacement resource when the second group of media resources and the first replacement resource are loaded and before the first group of media resources is loaded.

19. The information processing apparatus according to claim 18, wherein the processing circuitry is configured to:

display the first media resource in the first group of media resources in the first display area when the first group of media resources is loaded.

20. A non-transitory computer-readable storage medium, storing instructions which when executed by a processor cause the processor to perform:

receiving an interface display instruction to display a user interface;

loading, when a media resource set of the user interface includes a first group of media resources and a second group of media resources that is different from the first group of media resources, the second group of media resources in the media resource set based on the interface display instruction, a resource size of each media resource of the first group of media resources being greater than a threshold;

displaying the user interface with the second group of media resources when the second group of media resources are loaded and before the first group of media resources is loaded; and displaying the first group of media resources in the user interface with the second group of media resources when the first group of media resources is loaded.

* * * * *